US010810686B2

(12) United States Patent
Lin et al.

(10) Patent No.: US 10,810,686 B2
(45) Date of Patent: Oct. 20, 2020

(54) IDENTIFICATION OF RULE VIOLATIONS IN A NETWORK COMMUNITY

(71) Applicant: Shanghai Bilibili Technology Co., Ltd., Shanghai (CN)

(72) Inventors: Xiaoshan Lin, Shanghai (CN); Fang Fang, Shanghai (CN)

(73) Assignee: Shanghai Bilibili Technology Co., Ltd., Shanghai (CN)

( * ) Notice: Subject to any disclaimer, the term of this patent is extended or adjusted under 35 U.S.C. 154(b) by 62 days.

(21) Appl. No.: 16/194,249

(22) Filed: Nov. 16, 2018

(65) Prior Publication Data

US 2019/0156434 A1 May 23, 2019

(30) Foreign Application Priority Data

Nov. 17, 2017 (CN) .......................... 2017 1 1146513

(51) Int. Cl.
*G06Q 50/00* (2012.01)
*H04L 29/08* (2006.01)

(52) U.S. Cl.
CPC ............. *G06Q 50/01* (2013.01); *H04L 67/22* (2013.01); *H04L 67/306* (2013.01)

(58) Field of Classification Search
CPC ........ G06Q 50/01; G06Q 30/02; G06Q 10/10; G06Q 10/06; G06Q 30/06; G06Q 50/265; G06F 1/163; G06F 3/00; G06F 16/9535; G06F 3/04847; G06F 16/958; G06F 21/10; G06F 3/0482; H04L 65/403; H04L 51/32; H04L 12/1831; H04L 65/1089; H04L 67/12; H04N 7/185; H04N 7/155
See application file for complete search history.

(56) References Cited

U.S. PATENT DOCUMENTS 8,306,922 B1 * 11/2012 Kunal .................... G06Q 50/01
   705/319
8,311,950 B1 * 11/2012 Kunal ................ G06Q 30/0201
   705/319

(Continued)

FOREIGN PATENT DOCUMENTS

CN        101667182 A       3/2010
CN        104753758 A       7/2015

(Continued)

*Primary Examiner* — Ninos Donabed
(74) *Attorney, Agent, or Firm* — BakerHostetler

(57) ABSTRACT

Techniques for identifying rule violations in a network community are described herein. The disclosed techniques include receiving a report event from a first client computing device, wherein the report event is associated with content and a possible violation and the content comprises one or more comments relative to a plurality of video frames; identifying the content based on the possible violation; sending the content to a plurality of review users, wherein the content is presented and viewable via an interface by each review user; determining whether a voting instruction has been received from each review user during a predetermined period of time; recording a voting instruction from a first review user in a list of voting instructions in response to a determination that the voting instruction has been received during the predetermined period of time; and identifying the possible violation as a violation based on the list of voting instructions.

15 Claims, 12 Drawing Sheets

(56) References Cited

U.S. PATENT DOCUMENTS

| | | | | |
|---|---|---|---|---|
| 8,997,229 B1* | 3/2015 | Huang | ................... | G06Q 50/00 |
| | | | | 726/23 |
| 9,384,258 B1* | 7/2016 | Lee-chan | ............. | G06F 3/0481 |
| 9,916,755 B1* | 3/2018 | Ratti | ................... | G08G 1/0175 |
| 2003/0080878 A1* | 5/2003 | Kirmuss | ................ | B60R 11/02 |
| | | | | 340/936 |
| 2003/0081127 A1* | 5/2003 | Kirmuss | ................ | G08G 1/054 |
| | | | | 348/207.99 |
| 2003/0081128 A1* | 5/2003 | Kirmuss | ......... | G08B 13/19647 |
| | | | | 348/207.99 |
| 2009/0132689 A1* | 5/2009 | Zaltzman | ............. | G06Q 10/00 |
| | | | | 709/223 |
| 2009/0245573 A1* | 10/2009 | Saptharishi | ........ | G06K 9/00718 |
| | | | | 382/103 |
| 2013/0080266 A1* | 3/2013 | Molyneux | ............. | G06Q 10/00 |
| | | | | 705/14.72 |
| 2013/0152211 A1* | 6/2013 | Wu | ........................ | G06F 21/10 |
| | | | | 726/26 |
| 2014/0115671 A1* | 4/2014 | Abhyanker | ........... | H04W 4/021 |
| | | | | 726/4 |
| 2014/0156748 A1* | 6/2014 | Allen | .................... | G06Q 10/10 |
| | | | | 709/204 |
| 2014/0181120 A1* | 6/2014 | Sullivan | ................ | G06Q 50/01 |
| | | | | 707/748 |
| 2014/0181194 A1* | 6/2014 | Sullivan | ................. | H04L 67/22 |
| | | | | 709/204 |
| 2014/0181195 A1* | 6/2014 | Sullivan | ................. | H04L 67/22 |
| | | | | 709/204 |
| 2015/0195295 A1* | 7/2015 | Sandler | ............. | G06Q 30/0203 |
| | | | | 726/26 |
| 2015/0381379 A1 | 12/2015 | O'Sullivan et al. | | |
| 2016/0155332 A1* | 6/2016 | Wang | .................... | G08G 1/015 |
| | | | | 340/932.2 |
| 2016/0232785 A1* | 8/2016 | Wang | ............... | G08G 1/096816 |
| 2016/0294753 A1* | 10/2016 | Centner | ................. | H04L 51/12 |
| 2017/0070458 A1* | 3/2017 | Kunieda | .............. | H04L 51/046 |
| 2017/0187952 A1* | 6/2017 | Okada | .................... | B64D 47/08 |
| 2017/0222676 A1* | 8/2017 | Piccioni | ................ | H02J 7/025 |
| 2017/0236108 A1* | 8/2017 | Bennett | ................ | G06F 16/683 |
| | | | | 705/40 |

FOREIGN PATENT DOCUMENTS

| | | |
|---|---|---|
| CN | 105323145 A | 2/2016 |
| CN | 105898606 A | 8/2016 |
| CN | 105933392 A | 9/2016 |
| CN | 106060640 A | 10/2016 |
| CN | 106792229 A | 5/2017 |

* cited by examiner

IDENTIFICATION OF RULE VIOLATIONS IN A NETWORK COMMUNITY

BACKGROUND

Users may attempt to access conventional social media on their devices to communicate about interesting content. Using conventional social media may be cumbersome as users may have to switch back and forth between different applications to access the content of interest and social media related to the content. As communication devices, such as mobile phones, become more sophisticated, people continue to discover new ways to communicate.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION OF ILLUSTRATIVE EMBODIMENTS

Figure 1:
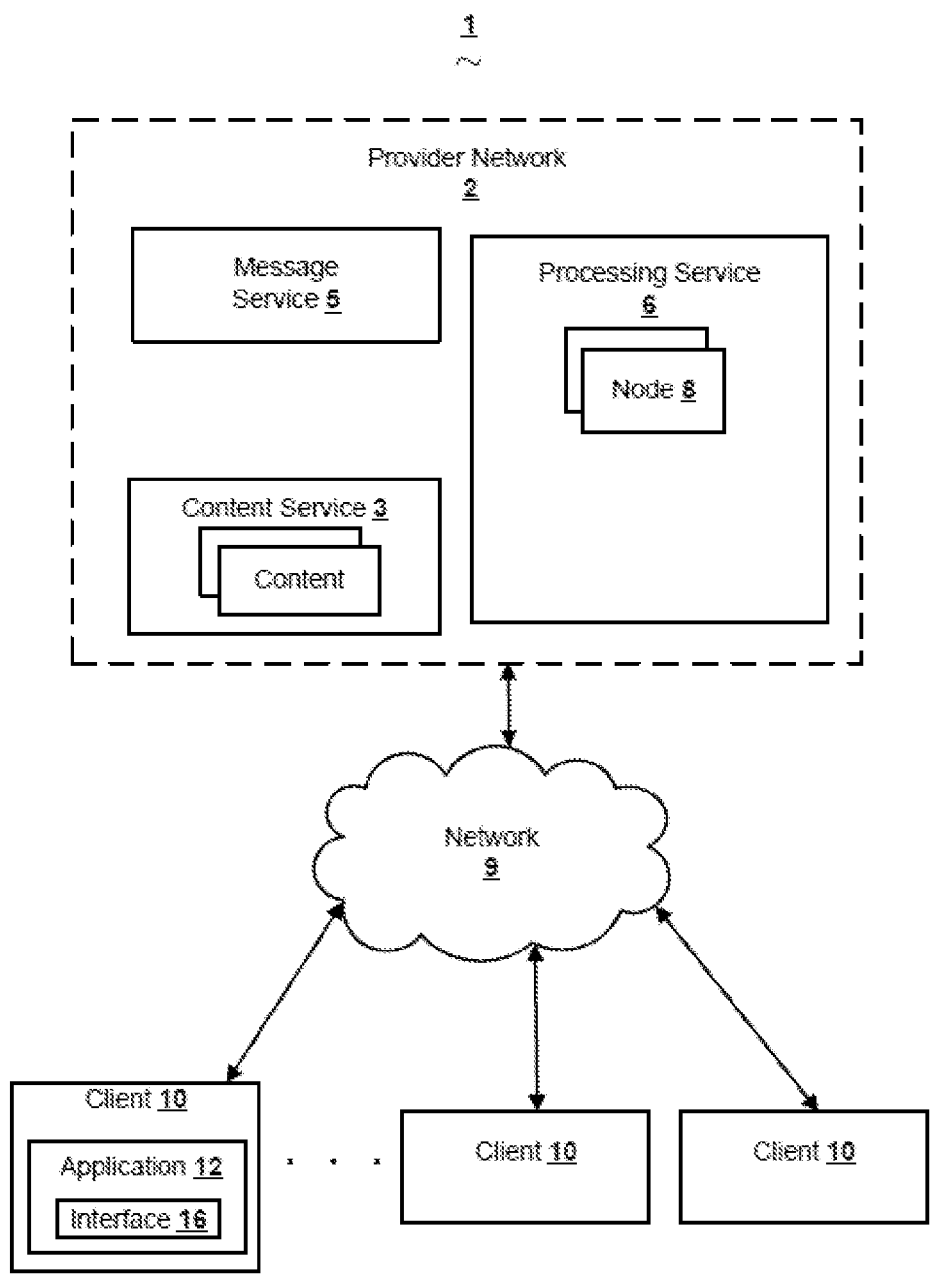
FIG. 1 is a schematic diagram illustrating an example system that may be used in accordance with the present disclosure.

FIG. 1 is a schematic diagram showing an example system 1 that may be used in accordance with the present disclosure. The system 1 may comprise a provider network 2 and a plurality of client devices 10. The provider network 2 and the plurality of client devices 10 may communicate with each other via one or more networks 9.

In some embodiments, the content service 3 may be implemented as part of the provider network 2. In other embodiments, the content service 3 may be managed by a separate service provider than a service provider of the provider network 2. It should also be understood that the provider network 2 may provide additional content services separate from the content service 5.

The content service 3 may comprise a content streaming service, such as an Internet protocol video streaming service. The content streaming service may be configured to distribute content via a variety of transmission techniques. The content service 3 may be configured to provide the content, such as video, audio, textual data, a combination thereof, and/or the like. The content may comprise content streams (e.g., video stream, audio stream, information stream), content files (e.g., video file, audio file, text file), and/or other data. The content may comprise gaming content. For example, the content service 5 may comprise a collaborative gaming platform, a video sharing service, a video hosting platform, a content distribution platform, and/or the like.

The provider network 2 may implement a commentary service configured to allow users to comment and/or share comments associated with content. The comments may be displayed with the content on the same screen. For example, the comments may be displayed in an overlay above the content. The comments may be encoded into a format of the content. For example, the comments may be encoded as video content as the original content. The comments may be animated when displayed. For example, the comments may be shown scrolling (e.g., from right to left, left to right, top to bottom, bottom to top) across the content, which may be referred to as "bullet screen."

The provider network 2 may be located at a data center, such as a single premises, or be distributed throughout different geographic locations (e.g., at several premises). The provider network 2 may provide the services via the one or more networks 9. The networks 9 comprise a variety of network devices, such as routers, switches, multiplexers, hubs, modems, bridges, repeaters, firewalls, proxy devices, and/or the like. The networks 9 may comprise physical links, such as coaxial cable links, twisted pair cable links, fiber optic links, a combination thereof, and/or the like. The networks 9 may comprise wireless links, such as cellular links, satellite links, Wi-Fi links and/or the like.

The provider network 2 may comprise a message service 5. The message service 5 may be configured to receive a plurality of messages. The plurality of messages may comprise a plurality of comments associated with content and information related to the plurality of comments. The plurality of messages may be associated with a particular content item, content session, and/or the like.

The message service 5 may be configured to manage messages for various content items. Users may browse content and access different content items to view comments for particular content, such as comments posted by other users for that particular content. Comments from users associated with a particular content item may be output to other users watching the particular content item. For example, all users accessing a content item (e.g., video clip) may view comments associated with the content item. Comments that are input may be output in real-time or near-real-time.

The message service 5 may be configured to process the plurality of messages. The message service 5 may implement a queue or otherwise prioritize processing of the plurality messages based on information, e.g., time stamps, incremented identifier, associated with corresponding comments. The message service 5 may be configured to process the plurality of messages using load balancing. For example, the message service 5 may be configured to use one or more of the plurality of processing nodes to process the messages, prioritize the messages, load balance the messages, and/or the like. The message service 5 may store, at least temporarily, the plurality of messages. The message service 5 may store the messages in a datastore, such as a database.

The message service 5 may be configured to process a message by performing a grouping process. The grouping process may comprise grouping messages based on a characteristic. If two messages have the same characteristic or are within a threshold range of a characteristic, then the messages may be grouped. Messages associated with a particular content item (e.g., stream, file, show, movie, song, game session) may be associated with the same group. For example, a message may comprise or be associated with a content identifier. The content identifier may uniquely identify the content item. The message service 5 may associate a message with a group associated with the content item if the content identifier is found in the message or otherwise associated with the message (e.g., sent separately).

The message service 5 may perform natural language processing, topic recognition, pattern recognition, artificial intelligence, and/or the like to automatically determine characteristics of the messages and/or group the messages. As an example, frequently occurring phrases or patterns may be identified as topics. As another example, a database of topics associated with content may be maintained. The topics may include genres (e.g., action, drama, comedy), personalities (e.g., actors, actresses, directors), languages, and/or the like. Messages may be grouped based on characteristics of the client device and/or users sending the messages. Demographics, interests, history, and/or like may be stored for a plurality of users to determine potential groupings of messages.

The message service 5 may be configured to process messages by determining contexts for outputting (e.g., displaying, presenting) comments comprised in the messages. The context may comprise a context for outputting a comment based on the grouping. The context may comprise a time context associated with a time to output the comment.

A message may indicate a time when a comment was input by a user. The time may comprise a time internal to the content item or other similar information, such as fragment identifiers. For example, the time may indicate a portion of the content item (e.g., one or more content fragments) that was viewed by a user when the user input a comment. The time may indicate when a user started inputting the comment, a duration of inputting, a time when the input was submitted, and/or the like.

The message service 5 may determine to output a comment during or close to the portion of content item being commented. In an example, if multiple messages are received for a portion of time (e.g., a scene), then a time offset may be added to some of the messages to prevent all of corresponding comments from being output at the same time.

The context may further comprise a graphical context associated with a form of the comment. The graphical context may comprise a size, a color, a font, and/or the like. The context may comprise a moving context in which the comment moves when output. The moving context may comprise an animation. For example, the moving context may comprise a direction of movement (e.g., left to right, right to left, up to down, down to up, diagonally). The moving context may comprise any type of animation, such as a spinning motion, a waving motion, a zig-zag, a circular motion, increasing in size, decreasing in size, and/or the like.

The context may be determined based on a preference associated with a message. For example, a user may specify a preference for how a corresponding comment is to be output. The user may specify the context for a particular comment. The context may be determined based on a characteristic of a particular content item. For example, the graphical context may be determined based on the background color of the content item during a particular segment. The graphical context may contrast with the background color of the content item.

The message service 5 may be further configured to process a message by generating output data. The output data may comprise instructions for implementing outputting a comment based on corresponding context. The output data may comprise application data for instructing an application to overlay the comment based on the context. The output data may comprise instructions for generating (e.g., encoding) content corresponding to a comment.

The output data may be used to generate (e.g., encode) output commentary content, such as an output content stream. The output commentary content may be combined (e.g., multiplexed) with original content item such as the content provided by the content service 3. The resulting combination may comprise content in a single package (e.g., container, transport container, transport stream). The package may comprise the original content item along with the output commentary content (e.g., displayed on top of the original content item).

The message service 5 may be further configured to process messages by performing a screening process. The screening process may comprise rejecting or flagging messages that match screening criteria. The screening criteria may specify terms and/or phrases, such as profanity, hate speech, indecent language, and/or the like. The screening criteria may specify characters, such as symbols, fonts, and/or the like. The screening criteria may specify languages, computer readable code patterns, and/or the like.

The provider network 2 may further comprise a processing service 6. The processing service 6 may be configured to provide processing for a variety of services, such as the services of the provider network 2. The processing service 6 may comprise a plurality of processing nodes 8 (e.g., as a service). The plurality of processing nodes 8 may process tasks associated with a message service 5. The plurality of processing nodes 8 may be implemented as one or more computing devices, one or more processors, one or more virtual computing instances, a combination thereof, and/or the like.

The plurality of processing nodes 8 may be implemented by one or more computing devices. The one or more computing devices may comprise virtualized computing instances. The virtualized computing instances may comprise a virtual machine, such as an emulation of a computer system, operating system, server, and/or the like. A virtual machine may be loaded by a computing device based on a virtual image and/or other data defining specific software (e.g., operating systems, specialized applications, servers) for emulation. Different virtual machines may be loaded and/or terminated on the one or more computing devices as the demand for different types of processing services changes. A hypervisor may be implemented to manage the use of different virtual machines on the same computing device.

The plurality of processing nodes 8 may comprise nodes associated with providing specific services (e.g., processing tasks). The nodes may be dedicated to providing these specific services. For example, the plurality of processing nodes 8 may implement a receiver, a content generator, a combiner, a transcoder, a combination thereof; the plurality of processing nodes 8 may also process events submitted by the plurality of client computing devices. The events may be associated with crowd topics for discussing real-time news, movies, or television programs; social hot topics; reports, and/or the like. In some implementations, these services may be implemented as dedicated computing devices, dedicated processors, dedicated virtual machine instances, and/or the like. In other implementations, a variety of different nodes may implement any of the functions associated with these services.

The plurality of client devices 10 may be configured to access the content and the services of the provider network 2. The plurality of client devices 10 may comprise any type of computing device, such as a mobile device, a tablet device, laptop, a computing station, a smart device (e.g., smart apparel, smart watch, smart speaker, smart glasses), a virtual reality headset, a gaming device, a set top box, digital streaming device, robot, a vehicle terminal, a smart TV, a TV box, an e-book reader, MP3 (Moving Picture Experts Group Audio Layer III) players, MP4 (Moving Picture Experts Group Audio Layer IV) players, and so on.

The plurality of client devices 10 may be associated with one or more users. A single user may use one or more of the plurality of client devices 10 to access the provider network 2. The plurality of client devices 10 may travel to a variety of locations and use different networks to access the provider network 2.

An example client device 10 may comprise an application 12. The application 12 outputs (e.g., display, render, present) content to a user. The content may comprise videos, audio, comments, textual data and/or the like. The application 12 may also provide a menu for navigating a variety of content.

The client device 10 may access an interface 16 that allows users to provide comments associated with corresponding content and submit events to a processing service. The interface 16 may comprise an input element. For example, the input element may be configured to receive input from a user, such as comments associated with a particular content, events, user accounts, and/or the like. In some embodiments, the interface 16 may be implemented as part of the application 12.

The application 12 may allow a user to set a context (e.g., color, font size, animation, emoji, scrolling direction) associated with his or her input. The application 132 may determine (e.g., automatically) other context information, such as timing information (e.g., start time, duration, end time for the input). The application 12 may send the input, the context, the context information, and/or other information to the message service 5 of the provider network 2. The application 12 may also send events to a processing service. As an example, the application 12 may send an event comprising reasons of submitting the event, content attributes associated with the event, account information of the user account, and/or the like. The techniques for processing events in accordance with the present disclosure can be implemented by the example system as shown in FIG. 1.

Figure 2:
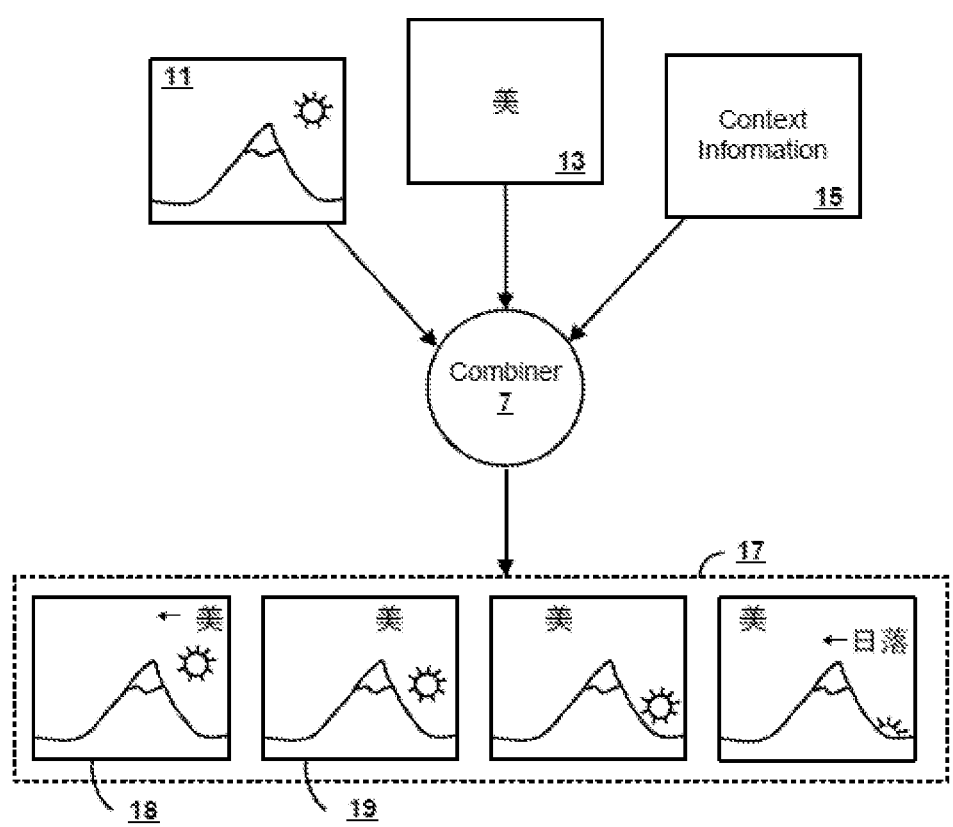
FIG. 2 is a schematic diagram illustrating an example process for combining content that may be used in accordance with the present disclosure.

FIG. 2 is a schematic diagram showing an example process for combining content. A combiner 7 may be configured to receive content 11. As illustrated in this example, the content 11 may comprise a video. It should be understood that other content may be used. The content 11 may comprise a plurality of frames, such as a series of images. The plurality of frames may be time ordered. For example, a first frame may be ordered before a second frame.

The combiner 7 may be implemented by any of the services and/or devices described herein. For example, the combiner 7 may be implemented by the processing service 6 or the message service 5 of the provider network 2. In other examples, the combiner 7 may be implemented by the application 12 of the client devices 10.

The combiner 7 may be configured to receive message data 13 associated with the content 11. The message data 13 may comprise one or more characters. As illustrated in this example, shown in FIG. 2, a Chinese character is shown. It should be understood, that the message data 13 may comprise multiple characters, symbols, and/or like in one or more languages. For example, the message data 13 may comprise comments from users associated with the content 11.

The combiner 7 may be further configured to receive context information 15. The context information 15 may indicate a context for rendering the message data 13 associated with the content 11. The context information 15 may comprise timing information indicating a time to render the message data 13 with the content 11. The context information 15 may comprise a start time associated with the message data, a scrolling speed, a font size, a font color, an end time associated with the message data, and/or other relevant information.

The combiner 7 may be configured to combine the content 11 and the message data 13 to generate combined content 17 based on the context information 15. The combiner 7 may combine the content 11 and the message data 13 by generating a content package. The content package may comprise a container, such as a transport container (e.g., MPEG transport or other transport container), a formatted container (e.g., as specified for an encoding format). The content package may comprise instructions for a rendering engine to render the content 11 and the message data 13 at least partially together.

As shown in FIG. 2, the combiner 7 may combine the content 11 and the message data 13 by generating a modified video. For example, at least a portion of the message data may be added to the plurality of frames. The message data may be animated separately from the video and/or may be combined with (e.g., overlain, inserted into, added to, associated with, encoded into) frames of the video.

Using the content information, positions (e.g., relative to the plurality of frames) for the message data (e.g., characters) may be determined for one or more (or each) of the plurality of frames. A first position may be determined for a first frame 18. A second position may be determined for the second frame 19. The second position may be different than the first position. The second position may be determined based on the first position.

For example, a path for rendering characters of the message data may be determined. The path may specify a direction for animating and/or scrolling text above the content 11. The direction may vary. For example, the path may be curvilinear. The second position may be further along the path than the first position (e.g., if the second frame is after the first frame in the time ordering). If the path is from right to left, as shown in FIG. 2, then the second position may be further left than the first position. The combiner 7 may combine the content 11 and the message data 13 in a manner that the message data 13 is successively rendered along the path as the plurality of frames of the content progress.

Though only one character is shown, the combiner 7 may be configured to receive message data from a variety of sources at any time and combine the message data 13 with the content 11. For example, message data 13 from a plurality of users may be received and combined with the content 11. Different message data 13 may be combined in a manner that the message data 13 is rendered at least partially simultaneously.

For example, several messages from different users (e.g., another user may comment "日落" or sunset) may be rendered at least partially at the same time with the content 11. The message data may be combined in a manner that allows for the content 11 to remain viewable during rendering of the message data. For example, the message data may be combined with the content 11 using constraints that limit the number of messages shown simultaneously, limit the location of message data (e.g., shown in areas where pixels have less change, shown in background areas of the content), and/or the like as described further herein. As an example, the message data may be shown in a background, such as the sky behind a mountain in the example of FIG. 2. In other embodiments, the message data are not received as a series of messages, but rather the messages are combined and rendered by a separate service. In such an embodiment, the messages are not separately identifiable by the combiner 7 but rather are received as, e.g., a video overlay.

Figure 3:
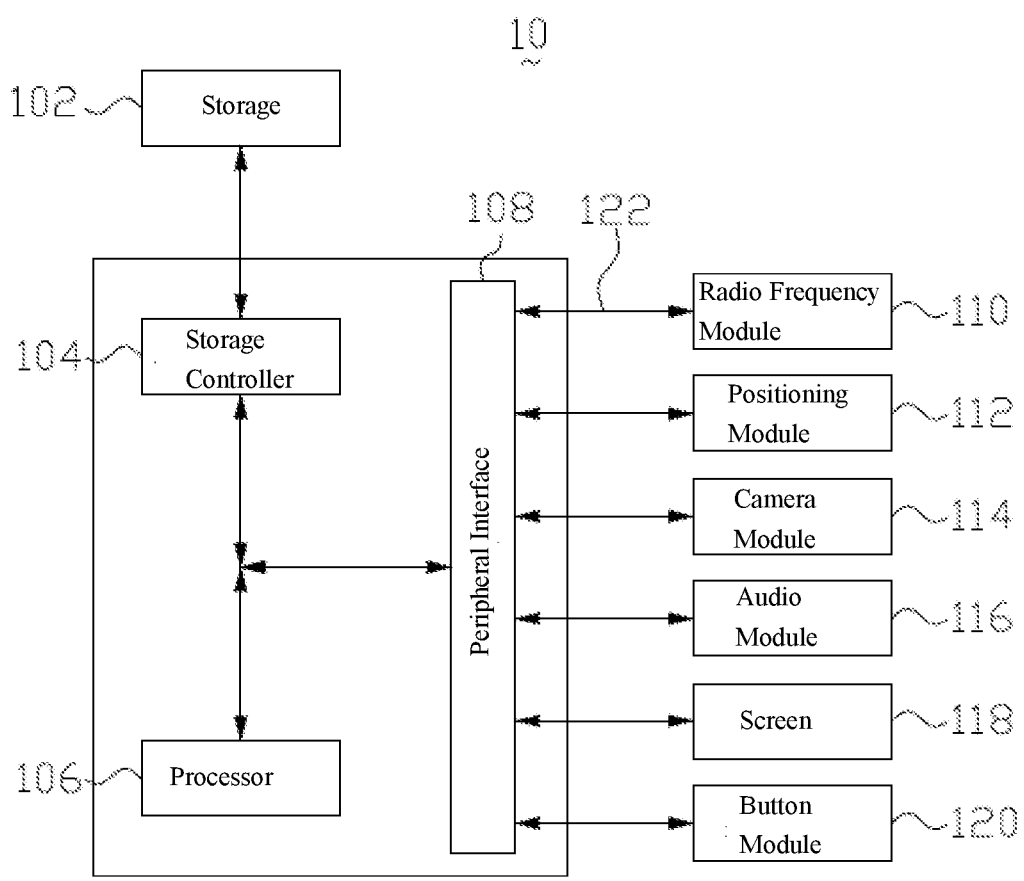
FIG. 3 is a schematic diagram illustrating an example computing device that may be used in accordance with the present disclosure.

FIG. 3 shows a structure block diagram of an example client computing device. As shown in FIG. 3, the terminal 10 includes a storage 102, a storage controller 104, one or more (only one is shown in the figure) processors 106, a peripheral interface 108, a radio frequency module 110, a positioning module 112, a camera module 114, an audio module 116, a screen 118, and a button module 120. These components communicate with each other through one or more communication buses/signal lines 122.

It can be understood that the structure shown in FIG. 3 is illustrative only, and the terminal 10 may also include more or fewer components than those shown in FIG. 3, or may have a configuration different from that shown in FIG. 3. The components shown in FIG. 3 can be implemented by hardwares, softwares or their combinations.

The storage 102 can be used to store software programs and modules, such as program instructions/modules corresponding to the crowd adjudication methods and the crowd adjudication systems in the embodiments of the present disclosure, the processor 106 runs the software programs and modules stored in the storage 102, so as to perform various functional applications and data processing, that is, to realize the crowd adjudication methods and the crowd adjudication systems mentioned above.

The storage 102 may include high-speed random access storages and may also include non-volatile storages, such as one or more magnetic storage devices, flash storages, or other non-volatile solid-state storages. In some embodiments, the storage 102 may further include storages set remotely relative to the processor 106, these remote storages can be connected to the terminal 10 through networks. Examples of the above-mentioned networks include, but are not limited to, the Internet, enterprise intranets, local area networks, mobile communication networks and their combinations. The processor 106 and other possible components visiting the storage 102 may be performed under the control of the storage controller 104.

The peripheral interface 108 couples various input/output devices to the CPU and the storage 102. The processor 106 runs various softwares and instructions in the storage 102 to perform various functions of the terminal 10 and data processing.

In some embodiments, the peripheral interface 108, the processor 106, and the storage controller 104 may be implemented in a single chip. In some other embodiments, they can be implemented by independent chips, respectively.

The radio frequency module 110 is used to receive and send electromagnetic waves, to realize the conversion between electromagnetic waves and electrical signals, so as to communicate with communication networks or other devices. The radio frequency module 110 may include various existing circuit elements for performing these functions, such as antennas, radio frequency transceivers, digital signal processors, encryption/decryption chips, user identity module (SIM) cards, storages, and so on. The radio frequency module 110 can communicate with various networks such as the Internet, enterprise intranets, wireless networks or communicate with other devices through wireless networks. The above-mentioned wireless networks can include cellular telephone networks, wireless local area networks or metropolitan area networks. These above-mentioned wireless networks can use a variety of communication standards, protocols and technologies, including, but are not limited to, Global System for Mobile Communication (GSM), Enhanced Data GSM Environment (EDGE), Wideband Code Division Multiple Access (W-CDMA), Code Division Multiple Access (CDMA), Time Division Multiple Access (TDMA), Bluetooth, Wireless Fidelity (WiFi) (e.g. IEEE (Institute of Electrical and Electronics Engineers) standards IEEE 802.11a, IEEE 802.11b, IEEE 802.11g, and/or IEEE 802.11n), Voice over Internet Protocal (VoIP), Worldwide Interoperability for Microwave Access (Wi-Max), other protocols for mails, instant messages and short messages, and any other suitable communication protocols, and may even include those that are not developed currently.

The positioning module 112 is used to obtain the current position of the terminal 10. Examples of the positioning module 112 include, but are not limited to, Global Positioning Systems (GPS), positioning technologies based on wireless local area networks or mobile communication networks.

The camera module 114 is used to take pictures or videos. The pictures or videos took can be stored in the storage 102 and can be sent through the radio frequency module 110.

The audio module 116 provides audio interfaces to users, which may include one or more microphones, one or more loudspeakers, and an audio circuit. The audio circuit receives sound data from the peripheral interface 108, converts the sound data into electrical information, and transmits the electrical information to the loudspeaker. The loudspeaker converts the electrical information into sound waves that can be heard by human ears. The audio circuit also receives electrical information from the microphone, converts the electrical signal into sound data, and transmits the sound data to the peripheral interface 108 for further processing. Audio data can be obtained from the storage 102 or through the radio frequency module 110. In addition, audio data can also be stored in the storage 102 or transmitted through the radio frequency module 110. In some examples, the audio module 116 may also include a headphone jack for providing an audio interface to a headphone or other devices.

The screen 118 provides an output interface between the terminal 10 and users. Specifically, the screen 118 displays video outputs to the users, the contents of which may include texts, graphics, videos, and any combination thereof. Some output results correspond to some user interface objects. It can be understood that the screen 118 can also include a touch screen. The touch screen provides an output and input interface simultaneously between the terminal 10 and the users. In addition to displaying the video outputs to the users, the touch screen also receives user inputs, such as user gesture operations like clicking, sliding and so on, so that the user interface objects respond to these user inputs. The techniques for detecting the user inputs may be resistive, capacitive or any other possible touch detection techniques. Specific examples of the touch screen display units include, but are not limited to, liquid crystal displays or luminescent polymer displays.

The button module 120 also provides an interface for the users to input to the terminal 10, the users can press different buttons to cause the terminal 10 to perform different functions.

Figure 4:
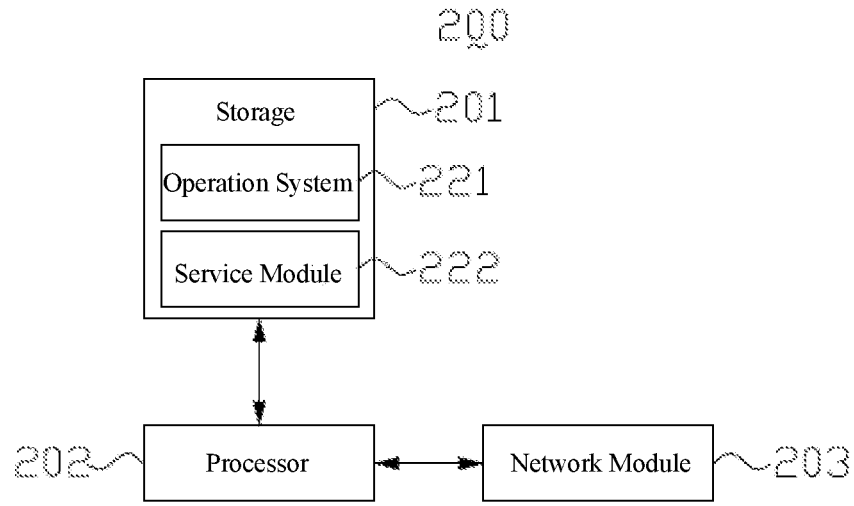
FIG. 4 is a schematic diagram illustrating an example server that may be used in accordance with the present disclosure.

FIG. 4 shows a structure block diagram of a server. As shown in FIG. 4, the server 200 includes: a storage 201, a processor 202, and a network module 203.

It can be understood that the structure shown in FIG. 4 is illustrative only, and the server 200 may also include more or fewer components than those shown in FIG. 4, or may have a configuration different from that shown in FIG. 4. The components shown in FIG. 4 can be implemented by hardware, software or their combinations. In addition, the servers in the embodiments of the present disclosure can also include a plurality of servers with different specific functions.

The Storage 201 can be used to store software programs and modules, such as program instructions/modules corresponding to the crowd adjudication methods and the crowd adjudication systems in the embodiments of the present disclosure, the processor 202 runs software programs and modules stored in the storage 201, so as to perform various functional applications and data processing, that is, to realize the crowd adjudication methods and the crowd adjudication systems in the embodiments of the present disclosure. The storage 201 may include high-speed random access storages and may also include non-volatile storages, such as one or more magnetic storage devices, flash storages, or other non-volatile solid-state storages. In some embodiments, the storage 201 may further include storages set remotely relative to the processor 202, these remote storages can be connected to the server 200 through networks. Furthermore, the above-mentioned software programs and modules can also include: an operation system 221 and a service module 222. Wherein the operating system 221, for example, can be LINUX, UNIX, WINDOWS, and can include various software components and/or drivers used for system management tasks (such as memory management, storage device control, power management, etc.), and can communicate with various hardware or software components, so as to provide running environments for other software components. The service module 222 runs on the basis of the operating system 221, and monitors requests from the networks through the network services of the operating system 221, completes corresponding data processing according to the requests, and returns the processing results to the terminal. That is to say, the service module 222 is used to provide network services to the terminal.

The network module 203 is used to receive and send network signals. The above-mentioned network signals may include wireless signals or wired signals. In one example, the above-mentioned network signal is a wired network signal. At this time, the network module 203 may include components such as a processor, a random access storage, a converter, a crystal oscillator, and so on.

Figure 5:
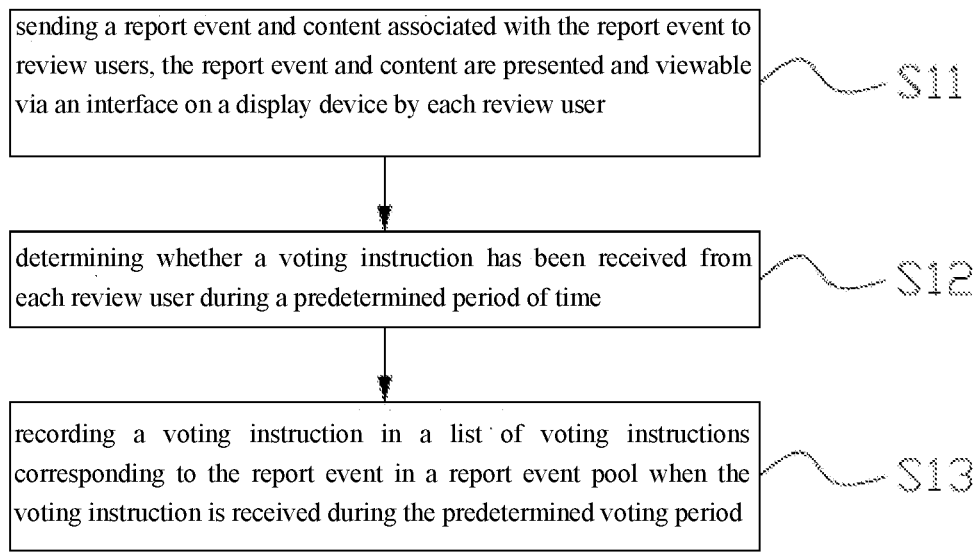
FIG. 5 is a flowchart illustrating an example process of the first embodiment of the present disclosure.

FIG. 5 is a flowchart of the crowd adjudication method of the first embodiment of the present disclosure. The present embodiment is a crowd adjudication method executed by the server. As shown in FIG. 5, the crowd adjudication method of the present embodiment may include the following steps:

Step S11: sending a report event and content associated with the report event to review users, the report event and content are presented and viewable via an interface on a display device by each review user.

Specifically, in the present embodiment, the report event may include, but is not limited to, reported videos, reported comments, reported bullet screens, reported tags, and the like. Specifically, when a user reports related videos, comments, bullet screens or tags, the case information related to the report event is collected and stored. When the server receives a case request, it sends the report event and the case information related to the report event to the user terminal, so as to display them in the voting interface of the user terminal.

Specifically, in the present embodiment, when the report event is a reported video, the video corresponding to the report event will be embedded in a play page in the voting interface to be displayed, so as to make the user of the review account watch without being able to send bullet screens.

Specifically, in the present embodiment, when the report event is a reported comment, all comments in the floor where the reported comment is located are displayed in the voting interface, and if they are posted in the same page by the reported person, a preset number of comments before and after the reported comment is displayed. If the reported comment is a reply to another floor, related case information such as the complete floor and so on is displayed. The preset number of comments may be, but is not limited to, 6, for example, the preset number of comments can also be set to a number more or less than 6, but it is not limited to this. Wherein, relevant comments are displayed in an ascending order according to the floor order, and the content posted by the reported person can be highlighted, for example, the content posted by the reported person can be, but is not limited to, marked in red to display, etc. Furthermore, the poster's picture, the poster's nickname, the floor where the poster is located, the posting time, the content of the comment, and the like related to the report event can also be displayed in the voting interface, and it can be, but is not limited to, located by default to the page where the reported comment of the report event is located.

Specifically, in the present embodiment, when the report event is a reported tag, the case information related to the report event may include, but is not limited to, a complete video tag modification record and corresponding content. Wherein, the corresponding content may include, but is not limited to, user's picture, user's nickname, modification time, operation type, tag content, and identification of the posting user of the present video, and so on, and it can be, but is not limited to, located by default to the page where the reported current record is located. The operation type can be, but is not limited to, adding, deleting, and the like.

Specifically, in the present embodiment, when the report event is a reported bullet screen, the case information related to the report event may include, but is not limited to, all bullet screens sent by the reported person in the video, which are highlighted, and a preset number of bullet screens within a first preset time before and after the video time of the reported bullet screen, a preset number of bullet screens within a second preset time before and after the sending time of the reported bullet screen. Wherein, the first preset time can be, but is not limited to, 5 s, the second preset time can be, but is not limited to, 24 h, the preset number of bullet screens can be, but is not limited to, 100, and the like, all bullet screens are displayed in pages, and it can be, but is not limited to, located by default to the page where the reported bullet screen is located.

Step S12: determining whether a voting instruction is received during a preset voting period or not.

Step S13: recording a voting instruction in a list of voting instructions corresponding to the report event in a report event pool when the voting instruction is received during the predetermined voting period.

Furthermore, in the present embodiment, the crowd adjudication method further comprises: controlling the user terminal to exit out of the voting interface automatically, waive the report event, and record noting in the voting result list corresponding to the report event, when the voting instruction is not received during the preset voting period.

Specifically, in the present embodiment, the user can view the report event and the case information related to the report event by logging in the review account and entering into the voting interface, so as to perform corresponding operations to the report event, such as whether the voting operation is performed or not, and if the voting operation is not performed within the preset voting period, it is regarded that the review user abstains from voting, and the waiving operation of the user to the report event is not displayed in historical voting cases, and at the same time is not calculated in the calculation of the voting accurate rate value. The review user will not be able to obtain the report event that the review user abandons any longer. Specifically, in the present embodiment, when the review user performs the voting operation within the preset voting period, the user terminal sends a voting instruction to the server, the server records the voting result accumulatively in the voting result list corresponding to the report event in the report event pool. Wherein, the preset voting period may be, but is not limited to, 1 h, for example, in other embodiments, the preset voting period can be, but is not be limited to, a period of time more or less than 1 h, for example, in other embodiments, the preset voting period is 30 min, 2 h, etc., but it is not limited to this.

Specifically, the voting instruction includes a voting violation instruction or a voting non-violation instruction, the voting result includes violation or non-violation. The voting violation instruction includes a violation blocking instruction or a violation only deleting instruction.

Specifically, in the present embodiment, when the review user performs the voting operation to the report event, he(she) can vote on the report event by triggering corresponding violation or legal virtual keys, and the user terminal sends a voting instruction to the server upon receiving the voting operation of the review user. Furthermore, after triggering a violation virtual case, the review user can further trigger a punishing virtual key corresponding to the report event, for example, the virtual key can be, but is not limited to, a violation blocking virtual key, a violation only deleting virtual key, etc.

Specifically, in the present embodiment, when the report event is closed and the report event is crowd adjudicated violation, the server will punish the report event that is crowd adjudicated violation correspondingly according to the violation blocking voting number and the violation only deleting voting number of the report event, for example, when the violation blocking voting number is greater than the violation only deleting voting number, the server will block the user of the report event for punishment. When the violation blocking voting number is less than or equal to the violation only deleting voting number, the server will only delete corresponding content of the user of the report event without blocking the user of the report event for punishment.

Figure 6:
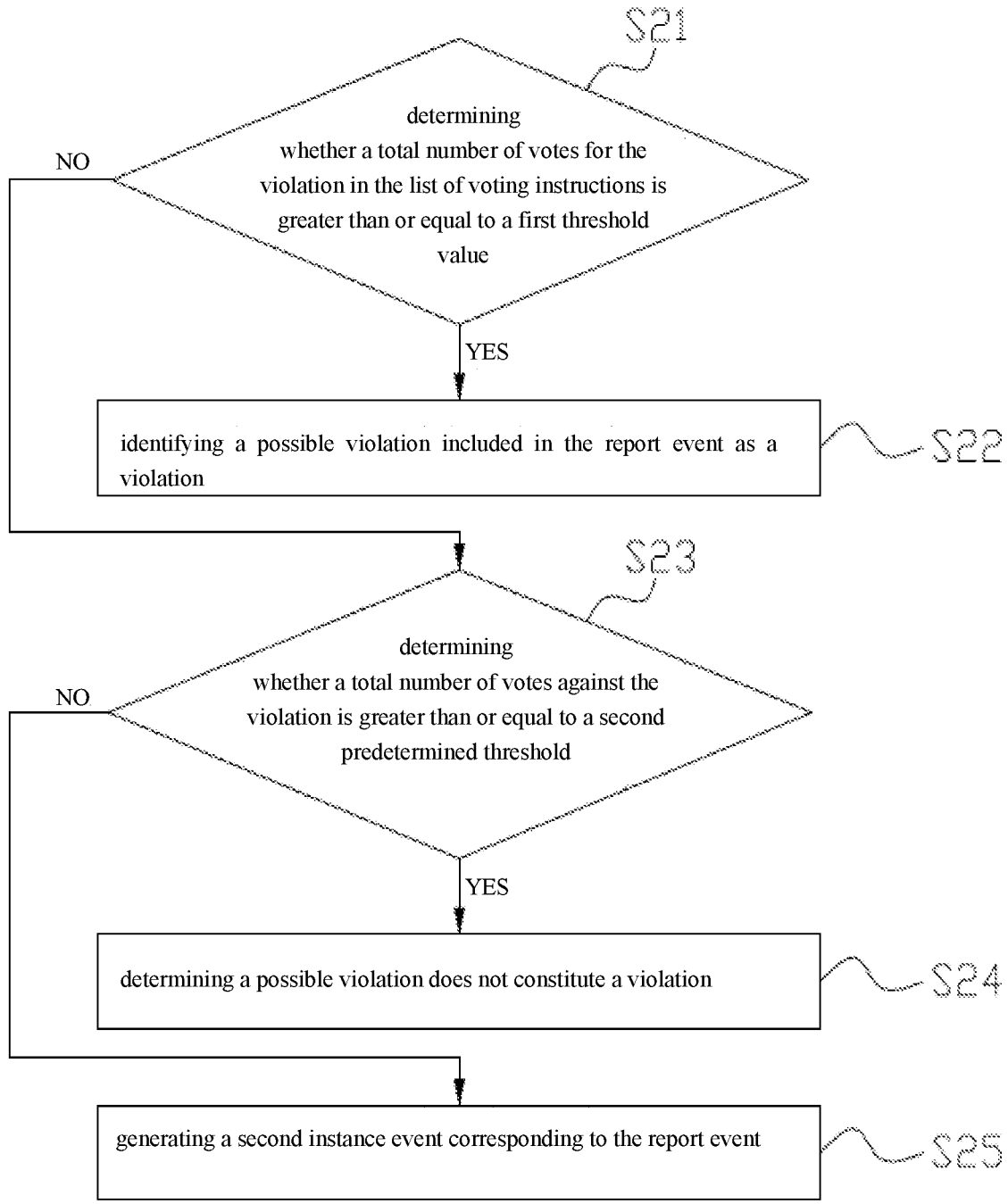
FIG. 6 is a flowchart illustrating an example process of the second embodiment of the present disclosure.

Please refer to FIG. 6, FIG. 6 is a flow chart of the crowd adjudication method of the second embodiment of the present disclosure. The crowd adjudication method is implemented by a server, and after Step S13, the crowd adjudication method provided in the present embodiment may comprise, but is not limited to, the following steps:

Step S21: determining whether a total number of votes for the violation in the list of voting instructions is greater than or equal to a first threshold value.

Specifically, in the present embodiment, if yes, Step S22: identifying a possible violation included in the report event as a violation. If not, Step S23: determining whether a total number of votes against the violation the list of voting instructions corresponding to the report event is greater than or equal to a second predetermined threshold.

Specifically, in the present embodiment, the violation threshold value may be, but is not limited to, the voting number corresponding to a preset percentage of the total voting number, the legal threshold value may be, but is not limited to, the voting number corresponding to a preset percentage of the total voting number, and specifically, in the present embodiment, the percentage of the violation threshold value and the percentage of the legal threshold value can be set same, for example, the percentages can be set, but are not limited to, to 80%, for example, they can be set to other percentages, and so on, but it is not limited to this, the percentage of the violation threshold value and the percentage of the legal threshold value can also be set differently. In order to better illustrate the specific process of the present embodiment, the voting result of the report event is exemplified hereinafter, when the percentage of the violation threshold value and the percentage of the legal threshold value are 80%, assuming that the total voting number of the report event is 100, the voting number of the violation threshold value is 80, and the voting number of the legal threshold value is 80, but it is not limited to this, in other embodiments, the violation threshold value and the legal threshold value can also be set to fixed voting numbers. The server monitors the voting result list in real time, so as to determine whether the accumulated violation voting number of the report event is greater than or equal to the violation threshold value or not, so that when the violation voting number of the report event is greater than the violation threshold value, the server adjudicates the user corresponding to the report event violation.

Specifically, when the legal voting number is greater than or equal to the legal threshold value, Step S24: determining that a possible violation does not constitute a violation. When the legal voting number is less than the legal threshold value, Step S25: determining the crowd adjudication of the report event invalid and generating a second instance event corresponding to the report event.

Specifically, in the present embodiment, when the server detects that the legal voting number is greater than or equal to the legal threshold value, it adjudicates the user corresponding to the report event legal. When the violation voting number is less than the violation threshold value, and the non-violation voting number is less than the violation threshold value, the server will adjudicate the crowd adjudication of the report event invalid, generate a second instance case corresponding to the report event, and store the generated second instance case in the report event pool.

Furthermore, in the present embodiment, whether the distribution time length of the report event reaches a preset distribution time length or not is determined. Specifically, if yes, Step S21 is performed; if not, return to the step of determining whether the distribution time length of the report event reaches a preset distribution time length or not.

Specifically, in the present embodiment, the preset distribution time length may be, but is not limited to, 24 hours, for example, the preset distribution time length may also be a time length longer or shorter than 24 hours. After the preset distribution time length is over, the server counts the violation voting number and the legal voting number of the report event, respectively, but it is not limited to this. For example, in other embodiments, when the violation voting number and the legal voting number are set to fixed voting numbers, the server can also count in real time the violation voting number and the legal voting number of the report event, respectively, so as to make a crowd adjudication result to the report event when the violation voting number reaches the violation threshold value or the legal voting number reaches the legal threshold value.

Specifically, in one embodiment, when the report event meets the preset conditions, the server will allocate the report event to all review accounts for voting, so as to crowd adjudicate the report event publicly, and provide the discussion of the report event to the user to watch. Specifically, the report event to be crowd adjudicated publicly may include, but is not limited to, the report event that has no upper limits for closing a case automatically by voting, the report event that will be distributed at the highest priority to the review account when the distribution begins, the review user having the review qualification can participate in the crowd adjudication of the report event by voting, a user can watch the crowd discussion comments on the report event released by the review users when the user logs in the user account, a user with a preset level can participate in the discussion zone of the report event to discuss. The voting for the report event to be crowd adjudicated publicly will be closed 24 hours after the voting begins, the result of the crowd adjudication voting will be published, and the punishment will not be automatically executed after the report event is closed, and the corresponding punishment is executed by audit managers after they review the result of the crowd adjudication voting, but it is not limited to this.

Figure 7:
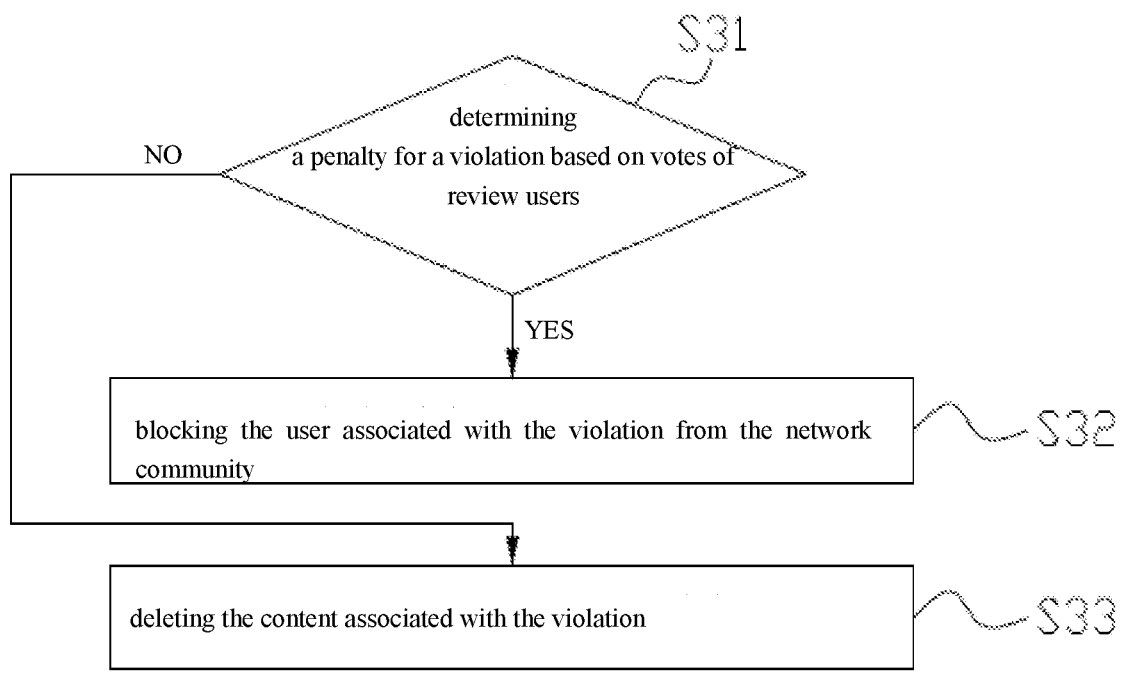
FIG. 7 is a flowchart illustrating an example process of the third embodiment of the present disclosure.

Please refer to FIG. 7, FIG. 7 is a flow chart of the crowd adjudication method of the third embodiment of the present disclosure. As stated in FIG. 5 and FIG. 7, after Step S22, the crowd adjudication method provided in the present embodiment may comprise, but is not limited to, the following steps:

Step S31: determining a penalty for a violation based on voting instructions received from review users.

Specifically, in the present embodiment, if yes, Step S32: blocking the user associated with the report event is performed. If not, Step S33: deleting the content associated with the report event is performed.

Specifically, in the present embodiment, when the report event is closed and the report event is crowd adjudicated violation, the server will punish the report event that is crowd adjudicated violation correspondingly according to the violation blocking voting number and the violation only deleting voting number of the report event, for example, when the violation blocking voting number is greater than the violation only deleting voting number, the server will block the user of the report event for punishment. When the violation blocking voting number is less than or equal to the violation only deleting voting number, the server will only delete corresponding content of the user of the report event without blocking the user of the report event for punishment.

Specifically, in the present embodiment, when the crowd adjudication result of the server to the report event is violation only deleting, if the report event is a reported comment or a reported bullet screen, only the corresponding comment is deleted, if the report event is a reported tag, a corresponding tag is deleted when the violation behavior is "adding a tag", a corresponding tag is restored when the violation behavior is "deleting a tag". When the report event is a reported video, the server will display the crowd adjudication result, the corresponding video content will be deleted manually by the video administrator after he(she) reviews the crowd adjudication result.

Specifically, in the present embodiment, when the crowd adjudication result of the report event is violation blocking, the server can determine, but is not limited to, whether the blocking punishment is executed or not according to the time when the reported behavior of the report event occurs. For example, if the time when the reported behavior of the report event occurs is before the latest blocking time, the blocking punishment is not executed. If the time when the reported behavior of the report event occurs is after the latest blocking time, 7 day/15 day/permanent blocking is executed according to the number of the historical violation blocking of the user of the report event correspondingly, but it is not limited to that, the blocking can be set to any other arbitrary time period. For example, it can be, but is not limited to, that when the number of the historical violation blocking of the user of the report event is less than 3, 7 day blocking is executed, when the number of the historical violation blocking of the user of the report event is between 3 and 5, 15 day blocking is executed, when the number of the historical violation blocking of the user of the report event is larger than 5, permanent blocking is executed, but it is not limited to that, the corresponding relationship of the blocking time length and the number of the historical violation blocking can also be set to another corresponding relationship.

Figure 8:
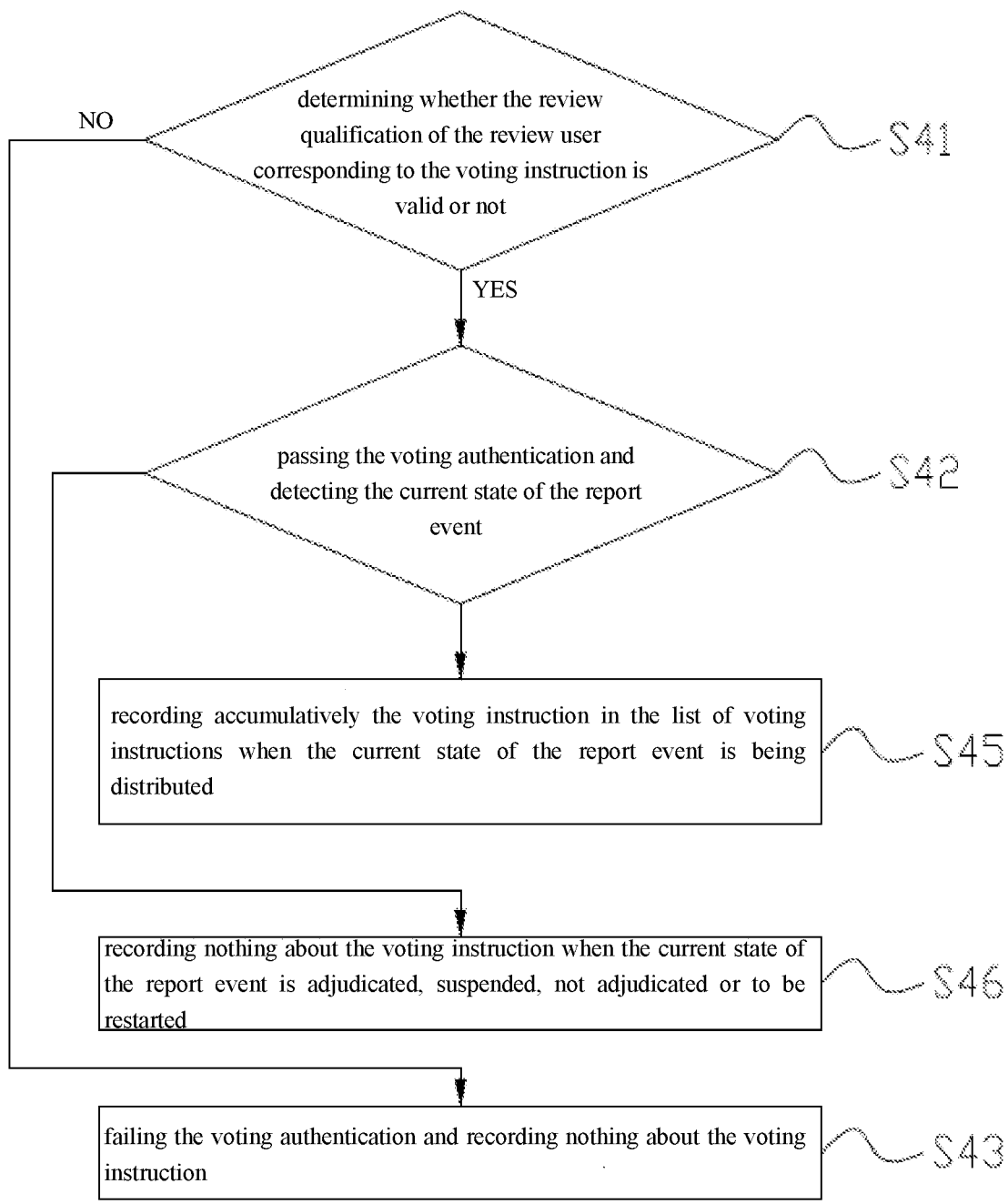
FIG. 8 is a flowchart illustrating an example process of the fourth embodiment of the present disclosure.

Please refer to FIG. 8, FIG. 8 is a flow chart of the crowd adjudication method of the fourth embodiment of the present disclosure. As shown in FIG. 8, the crowd adjudication method is implemented by a sever, when the voting instruction is received, the crowd adjudication method provided in the present embodiment may comprise, but is not limited to, the following steps:

Step S41: determining whether the review qualification of the review user corresponding to the voting instruction is valid or not.

Specially, in the present embodiment, if yes, Step S42: passing the voting authentication and detecting the current state of the report event is performed. If not, Step S43: failing the voting authentication and recording nothing about the voting result is performed.

Specially, in the present embodiment, the server authenticates the review qualification of the review account corresponding to the voting instruction and prompts the user the voting failure when the authentication fails.

Step S45: recording accumulatively the voting result in the voting result list corresponding to the report event in the report event pool when the current state of the report event is being distributed or being closed.

Step S46: recording nothing about the voting result when the current state of the report event is adjudicated, suspended, not adjudicated or to be restarted.

Specifically, in the present embodiment, when the remaining distribution time length of the report event is longer than the preset voting time length of the report event, the current state of the report event is being distributed, and being distributed means that the report event is being distributed.

When the remaining distribution time length of the report event is less than or equal to the preset voting time length of the report event, the current state of the report event is being closed, and being closed means that the report event will be closed soon. Adjudicated means that the report event has been crowd adjudicated, suspended means that the case will not be distributed any longer, not adjudicated means that the violation voting number and the legal voting number both do not satisfy the preset closing conditions of the report event.

Figure 9:
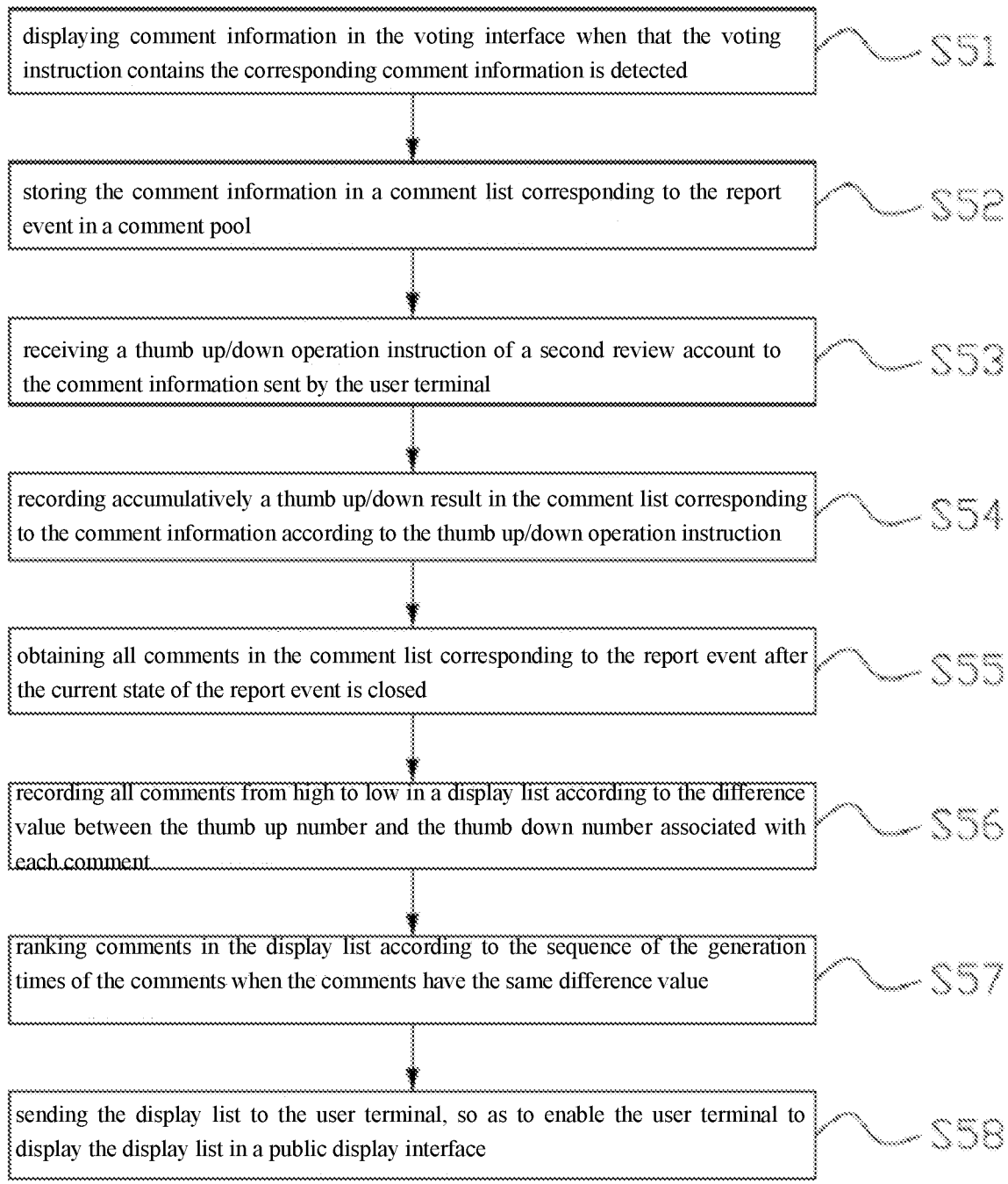
FIG. 9 is a flowchart illustrating an example process of the fifth embodiment of the present disclosure.

Please refer to FIG. 9, FIG. 9 is a flow chart of the crowd adjudication method of the fifth embodiment of the present disclosure. As shown in FIG. 5 and FIG. 9, the crowd adjudication method is implemented by a sever, after Step S13, the crowd adjudication method provided in the present embodiment may comprise, but is not limited to, the following steps:

Step S51: displaying comment information in the voting interface when that the voting result contains the corresponding comment information is detected.

Specially, in the present embodiment, in the process of voting on the report event, the review user may choose to release corresponding comment information. The comment information will be displayed randomly in the voting interface of the report event from the voting standpoint of the review user, and the review user can not release comment information when he(she) abstains from voting.

Step S52: storing the comment information in a comment list corresponding to the report event in a comment pool.

Specially, in the present embodiment, when the server detects that the voting result contains the comment information, it will store the comment information in the comment list corresponding to the report event in the comment pool.

Specially, in the present embodiment, the comment information can include, but is not limited to, the voting standpoint of a first review account and the comment content corresponding to the report event.

Step S53: receiving a thumb up/down operation instruction of a second review account to the comment information sent by the user terminal;

Step S54: recording accumulatively a thumb up/down result in the comment list corresponding to the comment information according to the thumb up/down operation instruction.

Specially, in the present embodiment, when the user of the second review account votes on the report event in the voting interface, he(she) can perform the thumb up/down operation to the comment information of the first review account to the report event displayed in the voting interface, wherein, when the user of the second review account abstains from voting, he(she) can also perform the thumb up/down operation to the comment information of the first review account to the report event displayed in the voting interface. The user terminal sends the thumb up/down operation instruction of the second review account to the comment information of the first review account to the report event to the server, the server records accumulatively the thumb up/down result in the corresponding comment list according to the thumb up/down operation instruction of the comment information of the report event.

Step S55: obtaining all pieces of comment information in the comment list corresponding to the report event after the current state of the report event is closed.

Step S56: recording the all pieces of comment information from high to low in a display list according to the difference value between the thumb up number and the thumb down number in each piece of comment information.

Step S57: ranking several pieces of comment information in the display list according to the sequence of the generation times of the several pieces of comment information when the several pieces of comment information have the same difference value.

Specially, in the present embodiment, after the report event is closed, the display list corresponding to the report event is obtained by ranking the comment information in the comment list of the report event from high to low.

Step S58: sending the display list to the user terminal, so as to enable the user terminal to display the display list in a public display interface.

Specially, in the present embodiment, it can display, but is not limited to, the display list permanently in the public display interface.

Figure 10:
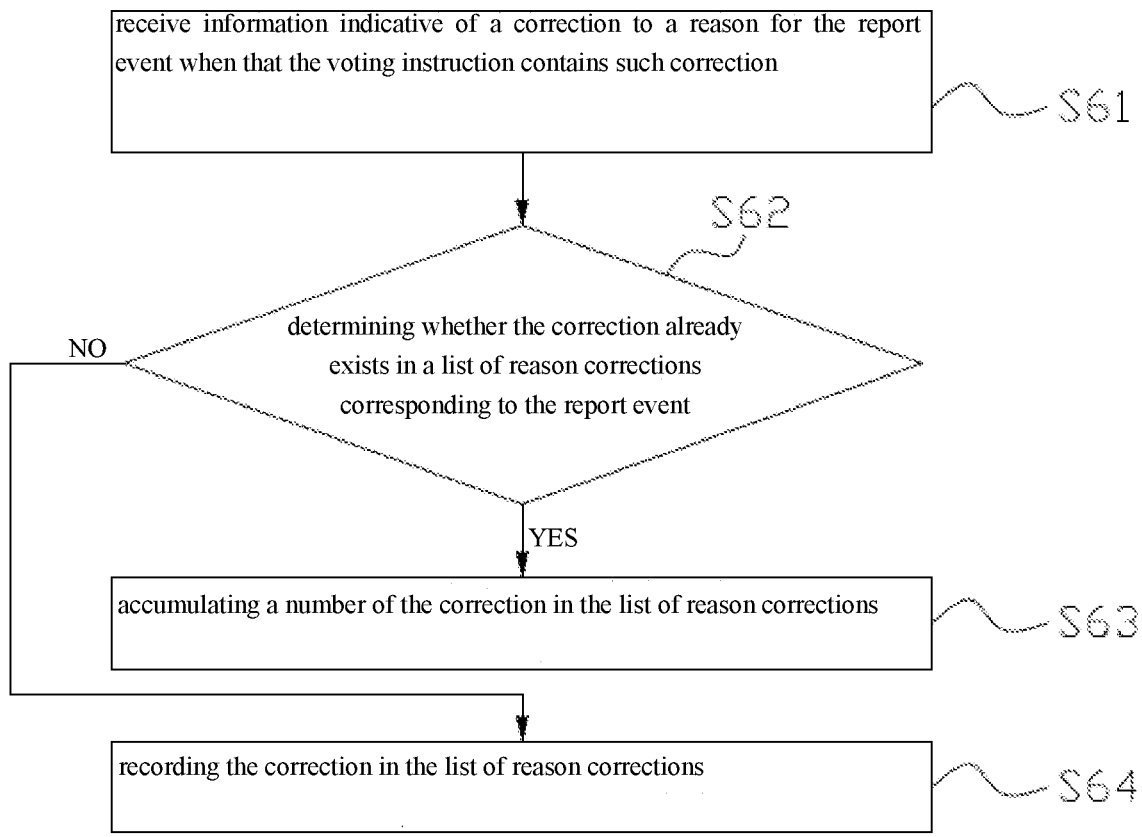
FIG. 10 is a flowchart illustrating an example process of the sixth embodiment of the present disclosure.
Figure 11:
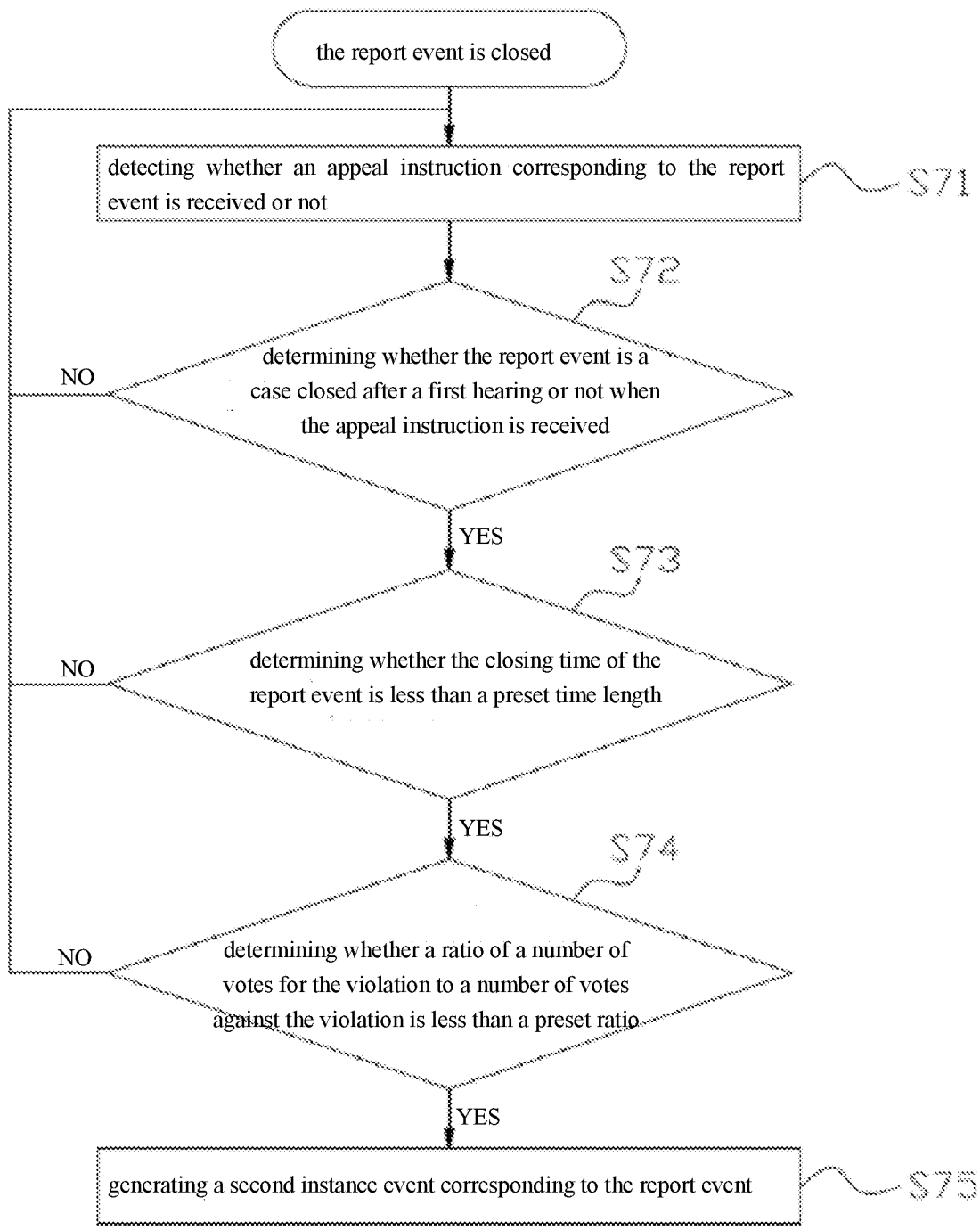
FIG. 11 is a flowchart illustrating an example process of the seventh embodiment of the present disclosure.

Please refer to FIG. 10, FIG. 10 is a flowchart of the crowd adjudication method of the sixth embodiment of the present disclosure. As shown in FIG. 6 and FIG. 11, the crowd adjudication method is implemented by a sever, after Step S13, the crowd adjudication method provided in the present embodiment may comprise, but is not limited to, the following steps:

Step S61: receive information indicative of a correction to a reason for the report event when that the voting instruction contains the information.

Specially, in the present embodiment, the review user can submit, but is not be limited to, the reporting reason correction information of the report event while voting during the voting process after he(she) obtains the report event.

Step S62: determining whether the correction already exists in a list of reason corrections corresponding to the report event;

Specially, in the present embodiment, if yes, Step S63: accumulating a number of the correction in the list of reason corrections is performed. If not, Step S64: recording the report reason correction information in the list of reason corrections.

Specially, in the present embodiment, after Step S61, the crowd adjudication method may comprise, but is not limited to, the following steps:

Step 1: determining whether there is a first piece of reporting reason correction information whose accumulated voting number is greater than or equal to a preset voting number in the reporting reason correction list.

If yes, Step 2: updating the first piece of reporting reason correction information to a new reporting reason of the report event is performed; if not, return to Step 1.

Specifically, in the present embodiment, the preset voting number may be, but is not limited to, the voting number corresponding to 10 percent of the total voting number of the reporting reason correction information, and the preset voting number is at least 10, but it is not limited to this, for example, the preset voting number may also be a voting number corresponding to a ratio higher than 10 percent. When the accumulated voting number of one piece of reporting reason correction information is greater than or equal to the preset voting number, the reporting reason of the report event is changed to the reporting reason correction information. When the accumulated voting numbers of several pieces of reporting reason correction information all are greater than or equal to the preset voting number, the new reporting reason of the report event is the reporting reason correction information with the highest accumulated voting number.

Please refer to FIG. 11, FIG. 11 is a flow chart of the crowd adjudication method of the seventh embodiment of the present disclosure. As shown in FIG. 11, the crowd adjudication method is implemented by a sever, as to the closed report event, the crowd adjudication method provided in the present embodiment may comprise, but is not limited to, the following steps:

Step S71: detecting whether an appeal instruction corresponding to the report event is received or not.

Specially, in the present embodiment, after the report event is closed, the reported user corresponding to the report event can carry out the complaint operation. Specifically, when the reported user submits the complaint, he(she) can submit a complaint document with a preset number of words to defend the reported case correspondingly. Wherein, the preset number of words can be, but is not limited to, 2000. The server will perform a complaint screen to the complaint content for stop words and anti-cheating complaints, and automatically reject the complaint content that has not passed the complaint screen.

Step S72: determining whether the report event is a case closed after a first hearing or not when the appeal instruction corresponding to the report event is received.

Specially, in the present embodiment, if yes, Step S73: determining whether the closing time of the report event is less than a preset time length or not is performed. If not, return to Step S71.

Specially, in the present embodiment, after Step S73, the crowd adjudication method may comprise, but is not limited to, the following steps: When the closing time of the report event is less than the preset time length, Step S73: determining whether a ratio of a number of votes for the violation to a number of votes against the violation is less than a preset ratio is performed.

Specially, in the present embodiment, if yes, Step S75: generating a second instance case of the report event automatically is performed. If not, return to Step S71. When the closing time of the report event is greater than or equal to the preset time length, return to Step S71.

Specially, in the present embodiment, when the complaint content passes the complaint screen, the server will automatically generate the second instance case corresponding to the report event, and the case information contains all relevant information of the first instance case and the information of the complaint document of the reported user. The second instance case corresponding to the report event will be stored in the report event pool, so as to be allocated to corresponding review accounts for the second crowd adjudication. When the review user matches the second instance case corresponding to the report event, he(she) can vote on the second instance case corresponding to the report event in the voting interface of the user terminal.

Specially, in the present embodiment, the preset time length may be, but is limited to, 48 hours, for example, in other embodiments the preset time length may also be set to any other arbitrary time length value. The preset ratio may be, but is not limited to, 80% of the total voting number, for example, in other embodiments, the preset ratio may also be set to any other arbitrary ratio value.

Specially, in the present embodiment, after the second instance case of the report event is closed, when the result of the second instance case is legal, the punishment to the first instance case is withdrawn, and the corresponding blocking records, the moral integrity deductions, and so on are deleted. After the second instance case of the report event is closed, when the result of the second instance case is violation, the punishment to the first instance case is maintained. After the second instance case of the report event is closed, when the result of the second instance case is not adjudicated, the punishment to the first instance case is maintained.

Figure 12:
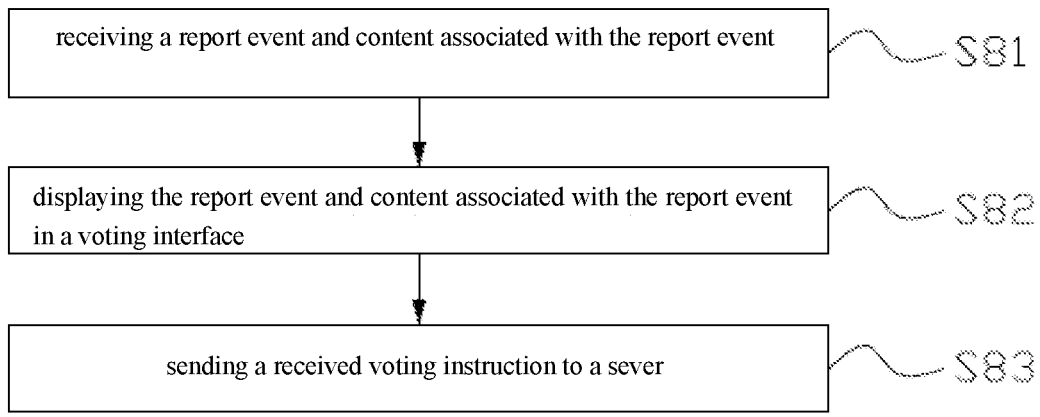
FIG. 12 is a flowchart illustrating an example process of the eighth embodiment of the present disclosure.

Please refer to FIG. 12, FIG. 12 is a flow chart of the crowd adjudication method of the eighth embodiment of the present disclosure. As shown in FIG. 12, the crowd adjudication method is implemented by a user terminal, wherein the user terminal can be, but is not limited to, the client terminal or the web page terminal installed on the terminal. The crowd adjudication method provided in the present embodiment may comprise, but is not limited to, the following steps:

Step S81: receiving a report event and content associated with the report event.

Step S82: displaying the report event and content associated with the report event in a voting interface.

Step S83: sending a received voting instruction to a sever.

Specially, in the present embodiment, the crowd adjudication method makes the sever determine whether the voting instruction is received during a preset voting period or not, and record accumulatively a voting result in a voting result list corresponding to the report event in a report event pool when the voting instruction is received during the preset voting period.

Furthermore, in the present embodiment, the user terminal exits out of the voting interface, waives the report event, and records noting in the voting result list corresponding to the report event, when the voting instruction is not received during the preset voting period.

Specially, in the present embodiment, the user can view the report event and the case information related to the report event by logging in the review account and entering into the voting interface, so as to perform corresponding operations to the report event, such as whether the voting operation is performed or not, and if the voting operation is not performed within the preset voting period, it is regarded that the review user abstains from voting, and the waiving operation of the user to the report event is not displayed in historical voting cases, and at the same time is not calculated in the calculation of the voting accurate rate value. The review user will not be able to obtain the report event that the review user abandons any longer. Specifically, in the present embodiment, when the review user performs the voting operation within the preset voting period, the user terminal sends a voting instruction to the server, the server records the voting result accumulatively in the voting result list corresponding to the report event in the report event pool. Wherein, the preset voting period may be, but is not be limited to, 1 h, for example, in other embodiments, the preset voting period can be, but is not be limited to, a period of time more or less than 1 h, for example, in other embodiments, the preset voting period is 30 min, 2 h, etc., but it is not limited to this.

Specifically, the voting instruction includes a voting violation instruction or a voting legal instruction, the voting result includes violation or non-violation.

Specifically, the voting violation instruction includes a violation blocking instruction or an violation only deleting instruction.

Specifically, in the present embodiment, the report event may include, but is not limited to, reported videos, reported comments, reported bullet screens, reported tags, and the like. Specifically, when a user reports related videos, comments, bullet screens or tags, the case information related to the report event is collected and stored. When the server receives a case request, it sends the report event and the case information related to the report event to the user terminal, so as to display them in the voting interface of the user terminal.

Specifically, in the present embodiment, when the report event is a reported video, the video corresponding to the report event will be embedded in a play page in the voting interface to be displayed, so as to make the user of the review account watch without being able to send bullet screens.

Specifically, in the present embodiment, when the report event is a reported comment, all comments in the floor where the reported comment is located are displayed in the voting interface, and if they are posted in the same page by the reported person, a preset number of comments before and after the reported comment is displayed. If the reported comment is a reply to another floor, related case information such as the complete floor and so on is displayed. The preset number of comments may be, but is not limited to, 6, for example, the preset number of comments can also be set to a number more or less than 6, but it is not limited to this. Wherein, relevant comments are displayed in an ascending order according to the floor order, and the content posted by the reported person can be highlighted, for example, the content posted by the reported person can be, but is not limited to, marked in red to display, etc. Furthermore, the poster's picture, the poster's nickname, the floor where the poster is located, the posting time, the content of the comment, and the like related to the report event can also be displayed in the voting interface, and it can be, but is not limited to, located by default to the page where the reported comment of the report event is located.

Specifically, in the present embodiment, when the report event is a reported tag, the case information related to the report event may include, but is not limited to, a complete video tag modification record and corresponding content. Wherein, the corresponding content may include, but is not limited to, user's picture, user's nickname, modification time, operation type, tag content, and identification of the posting user of the present video, and so on, and it can be, but is not limited to, located by default to the page where the reported current record is located. The operation type can be, but is not limited to, adding, deleting, and the like.

Specifically, in the present embodiment, when the report event is a reported bullet screen, the case information related to the report event may include, but is not limited to, all bullet screens sent by the reported person in the video, which are highlighted, and a preset number of bullet screens within a first preset time before and after the video time of the reported bullet screen, a preset number of bullet screens within a second preset time before and after the sending time of the reported bullet screen. Wherein, the first preset time can be, but is not limited to, 5 s, the second preset time can be, but is not limited to, 24 h, the preset number of bullet screens can be, but is not limited to, 100, and the like, all bullet screens are displayed in pages, and it can be, but is not limited to, located by default to the page where the reported bullet screen is located.

Specifically, in the present embodiment, when the review user performs the voting operation to the report event, he(she) can vote on the report event by triggering corresponding violation or non-violation virtual keys, and the user terminal sends a voting instruction to the server upon receiving the voting operation of the review user. Furthermore, after triggering an violation virtual case, the review user can further trigger a punishing virtual key corresponding to the report event, for example, the virtual key can be, but is not limited to, an violation blocking virtual key, an violation only deleting virtual key, etc.

Specifically, in the present embodiment, when the report event is closed and the report event is crowd adjudicated violation, the server will punish the report event that is crowd adjudicated violation correspondingly according to the violation blocking voting number and the violation only deleting voting number of the report event, for example, when the violation blocking voting number is greater than the violation only deleting voting number, the server will block the user of the report event for punishment. When the violation blocking voting number is less than or equal to the violation only deleting voting number, the server will only delete corresponding content of the user of the report event without blocking the user of the report event for punishment.

Figure 13:
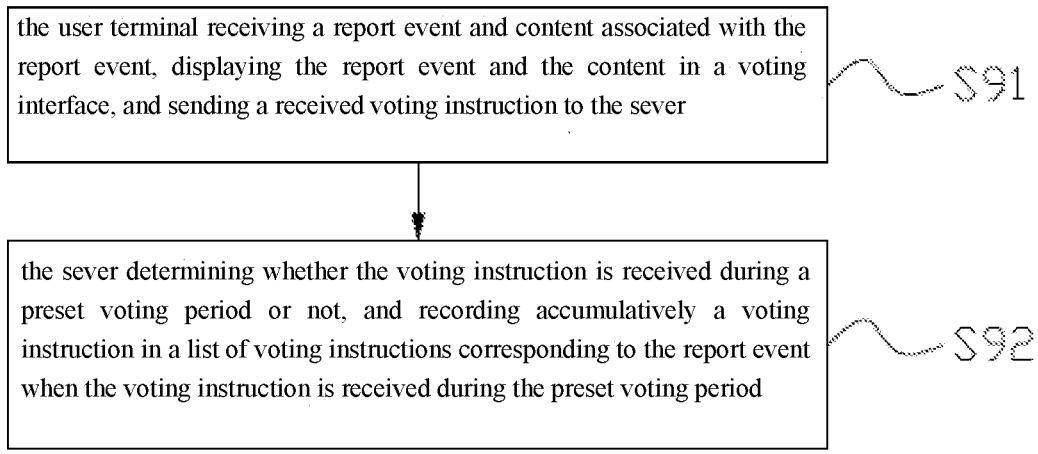
FIG. 13 is a flowchart illustrating an example process of the ninth embodiment of the present disclosure.

Please refer to FIG. 13, FIG. 13 is a flow chart of the crowd adjudication method of the ninth embodiment of the present disclosure. The crowd adjudication method is implemented by a user terminal and a server. The crowd adjudication method provided in the present embodiment may comprise, but is not limited to, the following steps:

Step S91: the user terminal receiving a report event and the content associated with the report event, displaying the report event and the content associated with the report event in a voting interface, and sending a received voting instruction to the sever.

Specifically, in the present embodiment, the report event may include, but is not limited to, reported videos, reported comments, reported bullet screens, reported tags, and the like. Specifically, when a user reports related videos, comments, bullet screens or tags, the case information related to the report event is collected and stored. When the server receives a case request, it sends the report event and the case information related to the report event to the user terminal, so as to display them in the voting interface of the user terminal.

Specifically, in the present embodiment, when the report event is a reported video, the video corresponding to the report event will be embedded in a play page in the voting interface to be displayed, so as to make the user of the review account watch without being able to send bullet screens.

Specifically, in the present embodiment, when the report event is a reported comment, all comments in the floor where the reported comment is located are displayed in the voting interface, and if they are posted in the same page by the reported person, a preset number of comments before and after the reported comment is displayed. If the reported comment is a reply to another floor, related case information such as the complete floor and so on is displayed. The preset number of comments may be, but is not limited to, 6, for example, the preset number of comments can also be set to a number more or less than 6, but it is not limited to this. Wherein, relevant comments are displayed in an ascending order according to the floor order, and the content posted by the reported person can be highlighted, for example, the content posted by the reported person can be, but is not limited to, marked in red to display, etc. Furthermore, the poster's picture, the poster's nickname, the floor where the poster is located, the posting time, the content of the comment, and the like related to the report event can also be displayed in the voting interface, and it can be, but is not limited to, located by default to the page where the reported comment of the report event is located.

Specifically, in the present embodiment, when the report event is a reported tag, the case information related to the report event may include, but is not limited to, a complete video tag modification record and corresponding content. Wherein, the corresponding content may include, but is not limited to, user's picture, user's nickname, modification time, operation type, tag content, and identification of the posting user of the present video, and so on, and it can be, but is not limited to, located by default to the page where the reported current record is located. The operation type can be, but is not limited to, adding, deleting, and the like.

Specifically, in the present embodiment, when the report event is a reported bullet screen, the case information related to the report event may include, but is not limited to, all bullet screens sent by the reported person in the video, which are highlighted, and a preset number of bullet screens within a first preset time before and after the video time of the reported bullet screen, a preset number of bullet screens within a second preset time before and after the sending time of the reported bullet screen. Wherein, the first preset time can be, but is not limited to, 5 s, the second preset time can be, but is not limited to, 24 h, the preset number of bullet screens can be, but is not limited to, 100, and the like, all bullet screens are displayed in pages, and it can be, but is not limited to, located by default to the page where the reported bullet screen is located.

Step S92: the sever determining whether the voting instruction is received during a preset voting period or not, and recording accumulatively a voting instruction in a list of voting instructions corresponding to the report event in a report event pool when the voting instruction is received during the preset voting period.

Specially, in the present embodiment, the server sends an automatic exit signal to the user terminal when the voting instruction is not received during the preset voting period; the user terminal exits out of the voting interface, waives the report event, and records noting in the voting result list corresponding to the report event when the user terminal receives the automatic exit signal.

Specially, in the present embodiment, the user can view the report event and the case information related to the report event by logging in the review account and entering into the voting interface, so as to perform corresponding operations to the report event, such as whether the voting operation is performed or not, and if the voting operation is not performed within the preset voting period, it is regarded that the review user abstains from voting, and the waiving operation of the user to the report event is not displayed in historical voting cases, and at the same time is not calculated in the calculation of the voting accurate rate value. The review user will not be able to obtain the report event that the review user abandons any longer. Specifically, in the present embodiment, when the review user performs the voting operation within the preset voting period, the user terminal sends a voting instruction to the server, the server records the voting result accumulatively in the voting result list corresponding to the report event in the report event pool. Wherein, the preset voting period may be, but is not be limited to, 1 h, for example, in other embodiments, the preset voting period can be, but is not be limited to, a period of time more or less than 1 h, for example, in other embodiments, the preset voting period is 30 min, 2 h, etc., but it is not limited to this.

Specifically, the voting instruction includes a voting violation instruction or a voting legal instruction, the voting result includes violation or non-violation.

Specifically, the voting violation instruction includes an violation blocking instruction or an violation only deleting instruction.

Specifically, in the present embodiment, when the review user performs the voting operation to the report event, he (she) can vote on the report event by triggering corresponding violation or non-violation virtual keys, and the user terminal sends a voting instruction to the server upon receiving the voting operation of the review user. Furthermore, after triggering a violation virtual case, the review user can further trigger a punishing virtual key corresponding to the report event, for example, the virtual key can be, but is not limited to, an violation blocking virtual key, an violation only deleting virtual key, etc.

Specifically, in the present embodiment, when the report event is closed and the report event is crowd adjudicated violation, the server will punish the report event that is crowd adjudicated violation correspondingly according to the violation blocking voting number and the violation only deleting voting number of the report event, for example, when the violation blocking voting number is greater than the violation only deleting voting number, the server will block the user of the report event for punishment. When the violation blocking voting number is less than or equal to the violation only deleting voting number, the server will only delete corresponding content of the user of the report event without blocking the user of the report event for punishment.

Figure 14:
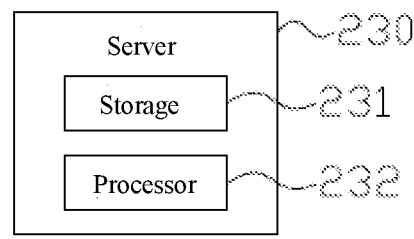
FIG. 14 is a structure block diagram of an example server of the tenth embodiment of the present disclosure.

Please refer to FIG.14, FIG. 14 is a structure block diagram of the server 230 of the tenth embodiment of the present disclosure. As shown in FIG. 14, the server 230 provided in the present embodiment is used to execute the crowd adjudication method, and the server 230 provided in the present embodiment includes a storage 231 and a processor 232. Specifically, as to the specific structure of the server 230, the server 200 shown in FIG. 3 can further be referred to.

Specifically, in the present embodiment, the storage 231 is used to store executable program codes; and the processor 232 is used to invoke the executable program codes in the storage 231, the execution steps include: sending a report event and the case information corresponding to the report event to a user terminal, so as to make the user terminal display the report event and the case information corresponding to the report event in a voting interface; determining whether a voting instruction is received during a preset voting period or not; recording accumulatively a voting result in a voting result list corresponding to the report event in a report event pool when the voting instruction is received during the preset voting period.

Specially, the server 230 is also used to control the user terminal to exit out of the voting interface automatically, waive the report event, and record noting in the voting result list corresponding to the report event, when the voting instruction is not received during the preset voting period.

Specially, the voting instruction includes a voting violation instruction or a voting legal instruction, the voting result includes violation or not.

Specially, the voting violation instruction includes a violation blocking instruction or a violation only deleting instruction.

Specially, the server 230 is also used to determine whether the total number of votes for the violation is greater than or equal to an violation threshold value according to the voting result list corresponding to the report event; identify a possible violation corresponding to the report event as a violation, if yes; determine whether the total number of votes against the violation is greater than or equal to a non-violation threshold value according to the voting result list corresponding to the report event, if not.

Specially, the server 230 is also used to determine the possible violation associated with the report event does not constitute a violation when the total number of votes against the violation is greater than or equal to a non-violation threshold value; adjudicate the crowd adjudication of the report event invalid and generate a second instance case corresponding to the report event when the total number of votes against the violation is less than a non-violation threshold value.

Specially, the server 230 is also used to determine whether the violation blocking voting number is greater than the violation only deleting voting number; block the user corresponding to the report event, if yes; delete the content corresponding to the report event, if not.

Specially, the server 230 is also used to determine whether the distribution time length of the report event reaches a preset distribution time length or not; perform the step of determining whether the accumulated violation voting number of the report event is greater than or equal to an violation threshold value or not according to the voting result list corresponding to the report event, if yes; return to the step of determining whether the distribution time length of the report event reaches a preset distribution time length or not.

Specially, the server 230 is also used to determine whether the review qualification of the review account corresponding to the voting instruction is valid or not; pass the voting authentication and detecting the current state of the report event, if yes; fail the voting authentication and recording nothing about the voting result, if not.

Specially, the server 230 is also used to record accumulatively the voting result in the voting result list corresponding to the report event in the report event pool when the current state of the report event is being distributed or being closed; record nothing about the voting result when the current state of the report event is adjudicated, suspended, not adjudicated or to be restarted.

Specially, the server 230 is also used to display comment information in the voting interface when that the voting result contains the corresponding comment information is detected; store the comment information in a comment list corresponding to the report event in a comment pool.

Specially, the comment information includes the voting position of a first review account and the comment content corresponding to the report event.

Specially, the server 230 is also used to receive a thumb up/down operation instruction of a second review account to the comment information sent by the user terminal; record accumulatively a thumb up/down result in the comment list corresponding to the comment information according to the thumb up/down operation instruction.

Specially, the server 230 is also used to obtain all pieces of comment information in the comment list corresponding to the report event after the current state of the report event is closed; record the all pieces of comment information from high to low in a display list according to the difference between the thumb up number and the thumb down number in each piece of comment information; rank several pieces of comment information in the display list according to the sequence of the generation times of the several pieces of comment information when the several pieces of comment information have the same difference; send the display list to the user terminal, so as to enable the user terminal to display the display list in a public display interface.

Specially, the server 230 is also used to record reporting reason correction information in a reporting reason correction list corresponding to the report event when that the voting result contains the corresponding reporting reason correction information is detected.

Specially, the server 230 is also used to determine whether the reporting reason correction information already exists in the reporting reason correction list or not; accumulate the reporting reason correction information in the reporting reason correction list, if yes; record the reporting reason correction information in the reporting reason correction list, if not;

Specially, the server 230 is also used to determine whether there is a first piece of reporting reason correction information whose accumulated voting number is greater than or equal to a preset voting number in the reporting reason correction list; update the first piece of reporting reason correction information to a new reporting reason of the report event, if yes; return to the step of determining whether there is a first piece of reporting reason correction information whose accumulated voting number is greater than or equal to a preset voting number in the reporting reason correction list, if not.

Specially, the server 230 is also used to detect whether a complaint instruction corresponding to the report event is received or not; determine whether the report event is a case closed after a first hearing or not when the complaint instruction corresponding to the report event is received; determine whether the closing time of the report event is less than a preset time length or not, if yes; return to the step of detecting whether a complaint instruction corresponding to the report event is received or not, if not.

Specially, the server 230 is also used to determine the voting ratio of the violation voting number of the report event is less than a preset ratio when the closing time of the report event is less than the preset time length; generate a second instance case of the report event automatically, if yes; return to the step of detecting whether a complaint instruction corresponding to the report event is received or not, if not.

Specially, the server 230 is also used to return to the step of detecting whether a complaint instruction corresponding to the report event is received or not when the closing time of the report event is greater than or equal to the preset time length.

Specifically, in the present embodiment, as to the specific structure of the server 230, please refer to the structure of the server 200 shown in FIG. 3, and it will not be repeated here.

As to the specific processes in which various functional units of the server 230 of the present embodiment carry out their own functions respectively, please refer to the specific content described in the embodiments shown in FIG. 4 and FIG. 10 mentioned above, and it will not be repeated here.

Figure 15:
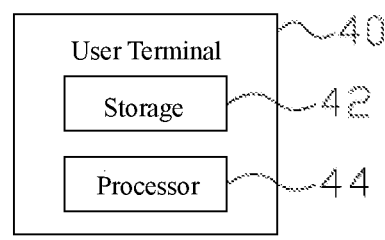
FIG. 15 is a structure block diagram of an example user terminal of the eleventh embodiment of the present disclosure.

Please refer to FIG. 15, FIG. 15 is a structure block diagram of the user terminal 40 of the eleventh embodiment of the present disclosure. As shown in FIG. 15, the server 40 provided in the present embodiment is used to execute the crowd adjudication method, specifically, the user terminal 40 includes: a storage 42 and a processor 44.

Specifically, the storage 42 is used to store executable program codes; and the processor 44 is used to invoke the executable program codes in the storage 42, the execution steps include: receiving a report event and the case information corresponding to the report event; displaying the report event and the case information corresponding to the report event in a voting interface; sending a received voting instruction to a sever, so as to make the sever determine whether the voting instruction is received during a preset voting period or not, and record accumulatively a voting result in a voting result list corresponding to the report event in a report event pool when the voting instruction is received during the preset voting period.

Specifically, the storage 42 is also used to exit out of the voting interface, waive the report event, and record noting in the voting result list corresponding to the report event, when the voting instruction is not received during the preset voting period.

Specifically, the voting instruction includes a voting violation instruction or a voting legal instruction, the voting result includes violation or legal.

Specifically, the voting violation instruction includes a violation blocking instruction or an violation only deleting instruction.

Specifically, in one embodiment, the user terminal 40 may also be a client terminal or a web page terminal, but it is not limited to this.

Specifically, in the present embodiment, as to the specific structure of the user terminal 40, please refer to the structure of the terminal 100 shown in FIG. 2, and it will not be repeated here.

As to the specific processes in which various functional units of the user terminal 40 of the present embodiment carry out their own functions respectively, please refer to the specific content described in the embodiment shown in FIG. 11 mentioned above, and it will not be repeated here.

Figure 16:
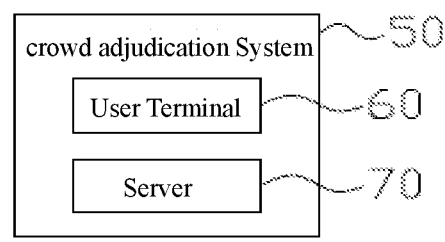
FIG. 16 is a structure block diagram of an example system of the twelfth embodiment of the present disclosure.

FIG. 16 is a structure block diagram of the crowd adjudication system 50 of the twelfth embodiment of the present disclosure. As shown in FIG. 16, the crowd adjudication system 50 provided in the present embodiment can be used to carry out the crowd adjudication method, the crowd adjudication system 50 includes a user terminal 60 and a server 70.

Specially, in the present embodiment, the user terminal 60 is used to receive a report event and the case information corresponding to the report event, so as to display the report event and the case information corresponding to the report event in a voting interface, and send a received voting instruction to the sever; the sever 70 is used to determine whether the voting instruction is received during a preset voting period or not, and record accumulatively a voting result in a voting result list corresponding to the report event in a report event pool when the voting instruction is received during the preset voting period.

Specifically, the server 70 is also used to send an automatic exit signal to the user terminal 30 when the voting instruction is not received during the preset voting period. The user terminal 60 is also used to exit out of the voting interface, waive the report event, and record noting in the voting result list corresponding to the report event when the user terminal receives the automatic exit signal.

Specifically, the voting instruction includes a voting violation instruction or a voting legal instruction, the voting result includes violation or non-violation.

Specifically, the voting violation instruction includes a violation blocking instruction or a violation only deleting instruction.

As to the specific processes in which various functional units of the crowd adjudication system 50 of the present embodiment carry out their own functions respectively, please refer to the specific content described in the embodiment shown in FIG. 13 mentioned above, and it will not be repeated here.

The above-mentioned server may include, but is not limited to, one or more second processors and one or more second storages. The second storage can be used to store software programs and modules, and the second processor performs various functional applications and data processing by running the software programs and the modules stored in the second storage.

The crowd adjudication method, the server, the user terminal and the crowd adjudication system provided by the present disclosure display the report event in the voting interface for users to vote, then adjudicate whether the user corresponding to the report event is violation or not, and punish the violation user correspondingly, so as to be capable of effectively solving the contradictory problem produced in the network community, forming a self-purification, self-government and self-improvement network community ecology, improving the video network environment, and enhancing the user experience.

In addition, the embodiments of the present disclosure also provide a computer-readable storage medium in which computer-executable instructions are stored, the computer-readable storage medium can be, for example, non-volatile storages such as optical disks, hard disks, or Flash memories. The above-mentioned computer executable instructions are used to allow a computer or similar computing devices to perform various operations in the crowd adjudication method described above.

It should be noted that, the various embodiments in this specification are described in a progressive manner, each of which focuses on the differences from other embodiments, and the same and similar parts among the various embodiments can be referred to each other. For terminal embodiments, because they are basically similar to the method embodiments, their descriptions are relatively simple, and the relevant points can just be referred to parts of the descriptions of the method embodiments.

What is claimed is:

1. A computer-implemented method of improving a computer network comprising a server computing device and a plurality of client computing devices, comprising:

receiving, by the server computing device, a report event from a first client computing device among the plurality of client computing devices, wherein the report event is associated with content, a user, and a possible violation of at least one of a set of predefined rules, wherein the content comprises one or more comments on a video that are configured to move relative to a plurality of frames of the video;

identifying, by the server computing device, the content based on the possible violation of the at least one of a set of predefined rules;

sending, by the server computing device, the report event and the content to a plurality of review users in the network community, wherein the plurality of review users have been authorized to review report events, wherein the content is presented and viewable via an interface on a display device by each of the plurality of review users, and wherein the interface allows each review user to input a voting instruction indicative of whether the content constitutes a violation of the at least one of a set of predefined rules;

determining, by the server computing device, whether a voting instruction has been received from each review user during a predetermined period of time;

automatically sending, by the server computing device, a control signal indicative of an exit from the interface to a first review user among the plurality of review users in response to a determination that a voting instruction from the first review user has not been received during the predetermined period of time;

recording, by the server computing device, a voting instruction from a second review user among the plurality of review users in a list of voting instructions corresponding to the report event in response to a determination that the voting instruction from the first review user has been received during the predetermined period of time;

identifying, by the server computing device, the possible violation as a violation associated with the user based on the list of voting instructions;

automatically generating, by the server computing device, a second instance event corresponding to the report event based on a plurality of predetermined rules;

performing, by the server computing device based on a result associated with the second instance event, at least one of deleting the content from the computer network, blocking the user from the computer network, or maintaining the content in the computer network;

wherein the computer-implemented method further comprises:

detecting, by the server computing device, that the voting instruction from the first review user comprises information indicative of a correction to a reason for the report event submitted by the first client computing device;

storing, by the server computing device, the correction to the reason for the report event in a list of reason corrections corresponding to the report event; and replacing, by the server computing device, the reason for the report event with a corrected reason in response to a determination that a number of the corrections from review users is greater than or equal to a predetermined threshold, wherein the corrected reason is presented and viewable via the interface by a fourth review user among the plurality of review users.

2. The computer-implemented method of claim 1, further comprising:

recording, by the server computing device, the voting instruction from the first review user in the list of voting instructions in response to further determinations that a review qualification of the first review user is valid and that a current status of the report event is a status of distribution.

3. The computer-implemented method of claim 1, wherein the voting instruction from the first review user comprises information indicative of whether the first review user selects to vote for or against the violation.

4. The computer-implemented method of claim 3, wherein the voting instruction from the first review user further comprises information indicative of a penalty among a plurality of penalties that the first review user selects to impose for the violation.

5. The computer-implemented method of claim 3, further comprises:

determining, by the server computing device, a total number of votes for or against the violation in the list of voting instructions in response to a determination that the predetermined period of time has elapsed;

identifying, by the server computing device, the possible violation as a violation based on determining that the total number of votes for the violation is greater than or equal to a first predetermined threshold; and determining, by the server computing device, whether the total number of votes against the violation is greater than or equal to a second predetermined threshold in response to a determination that the total number of votes for the violation is less than the first predetermined threshold.

6. The computer-implemented method of claim 5, further comprises:

determining, by the server computing device, that the possible violation is not a violation based on determining that the total number of votes against the violation is greater than or equal to the second predetermined threshold.

7. The computer-implemented method of claim 1, further comprising:

detecting, by the server computing device, that the voting instruction from the first review user comprises information indicative of a comment from the first review user;

storing, by the server computing device, the comment in a list of comments corresponding to the report event, wherein the list of comments comprises a plurality of comments;

sending, by the server computing device, the comment to a third review user among the plurality of review users, wherein the comment is presented and viewable via the interface by the third review user;

receiving, by the server computing device, a like or dislike instruction associated with the comment from the third review user; and recording, by the server computing device, the like or dislike instruction in the list of comments.

8. The computer-implemented method of claim 7, further comprising:

recording, by the server computing device, the plurality of comments in a display list in a rank order determined based on a difference between a total number of likes and a total number of dislikes associated with each comment; and sending, by the server computing device, the plurality of comments in the display list to a plurality of users in the network community, wherein the plurality of comments is presented and viewable via a second interface on a display device by each of the plurality of users.

9. The computer-implemented method of claim 1, further comprising:

detecting, by the server computing device, that an appeal instruction from the user associated with the violation has been received;

determining, by the server computing device, that the violation was identified for a first time and that a period of time from an identification of the violation is less than a predetermined period; and determining, by the server computing device, that a ratio of a number of votes for the violation to a number of votes against the violation when the violation was identified is less than a predetermined ratio.

10. A computing system of improving a computer network, comprising:

at least a processor; and at least a memory communicatively coupled to the at least a processor to configure the at least a processor to:

receive a report event from a first client computing device among the plurality of client computing devices, wherein the report event is associate with content, a user, and a possible violation of at least one of a set of predefined rules, wherein the content comprises one or more comments on a video that are configured to move relative to a plurality of frames of the video;

identify the content based on the possible violation of the at least one of a set of predefined rules;

send the content to a plurality of review users in the network community, wherein the plurality of review users have been authorized to review report events, wherein the content is presented and viewable via an interface on a display device by each of the plurality of review users, and wherein the interface allows each review user to input a voting instruction indicative of whether the content constitutes a violation of the at least one of a set of predefined rules;

determine whether a voting instruction has been received from each review user during a predetermined period of time;

automatically send a control signal indicative of an exit from the interface to a first review user among the plurality of review users in response to a determination that a voting instruction from the first review user has not been received during the predetermined period of time;

record a voting instruction from a second review user among the plurality of review users in a list of voting instructions corresponding to the report event in response to a determination that the voting instruction from the first review user has been received during the predetermined period of time;

identify the possible violation as a violation associated with the user based on the list of voting instructions;

automatically generate a second instance event corresponding to the report event based on a plurality of predetermined rules;

perform, based on a result associated with the second instance event, at least one of deleting the content from the computer network, blocking the user from the computer network, or maintaining the content in the computer network;

wherein the at least a memory further configures the at least a processor to:

detect that the voting instruction from the first review user comprises information indicative of a correction to a reason for the report event submitted by the first client computing device;

store the correction to the reason for the report event in a list of reason corrections corresponding to the report event; and replace the reason for the report event with a corrected reason in response to a determination that a number of the corrections from review users is greater than or equal to a predetermined threshold, wherein the corrected reason is presented and viewable via the interface by a fourth review user among the plurality of review users.

11. The computing system of claim 10, the at least a memory further configuring the at least a processor to:

determine a total number of votes for or against the violation in the list of voting instructions in response to a determination that the predetermined period of time has elapsed;

identify the possible violation as a violation based on determining that the total number of votes for the violation is greater than or equal to a first predetermined threshold; and determine whether the total number of votes against the violation is greater than or equal to a second predetermined threshold in response to a determination that the total number of votes for the violation is less than the first predetermined threshold.

12. The computing system of claim 11, the at least a memory further configuring the at least a processor to:

determine that the possible violation is not a violation based on determining that the total number of votes against the violation is greater than or equal to the second predetermined threshold.

13. The computing system of claim 10, the at least a memory further configuring the at least a processor to:

identify that the voting instruction from the first review user comprises information indicative of a comment by the first review user;

store the comment in a list of comments corresponding to the report event, wherein the list of comments comprises a plurality of comments;

sending the comment to a third review user among the plurality of review users, wherein the comment is presented and viewable via the interface by the third review user;

receive a like or dislike instruction associated with the comment from the third review user;

record the like or dislike instruction in the list of comments;

record the plurality of comments in a display list in a rank order determined based on a difference between a total number of likes and a total number of dislikes associated with each comment; and send the plurality of comments in the display list to a plurality of users in the network community, wherein the plurality of comments is presented and viewable via a second interface on a display device by each of the plurality of users.

14. The computing system of claim 10, the at least a memory further configuring the at least a processor to:

detect that an appeal instruction from the user associated with the violation has been received;

determine that the violation was identified for a first time and that a period of time from an identification of the violation is less than a predetermined period; and determine that a ratio of a number of votes for the violation to a number of votes against the violation when the violation was identified is less than a predetermined ratio.

15. A non-transitory computer-readable storage medium bearing computer-readable instructions that upon execution on a computing device cause the computing device at least to:

receive a report event from a first client computing device among the plurality of client computing devices, wherein the report event is associate with content, a user, and a possible violation of at least one of a set of predefined rules, wherein the content comprises one or more comments on a video that are configured to move relative to a plurality of frames of the video;

identify the content based on the possible violation of the at least one of a set of predefined rules;

send the content to a plurality of review users in the network community, wherein the plurality of review users have been authorized to review report events, wherein the content is presented and viewable via an interface on a display device by each of the plurality of review users, and wherein the interface allows each review user to input a voting instruction indicative of whether the content constitutes a violation of the at least one of a set of predefined rules;

determine whether a voting instruction has been received from each review user during a predetermined period of time;

automatically send a control signal indicative of an exit from the interface to a first review user among the plurality of review users in response to a determination that a voting instruction from the first review user has not been received during the predetermined period of time;

record a voting instruction from a second review user among the plurality of review users in a list of voting instructions corresponding to the report event in response to a determination that the voting instruction from the first review user has been received during the predetermined period of time;

identify the possible violation as a violation associated with the user based on the list of voting instructions;

automatically generate a second instance event corresponding to the report event based on a plurality of predetermined rules;

perform, based on a result associated with the second instance event, at least one of deleting the content from the computer network, blocking the user from the computer network, or maintaining the content in the computer network;

Wherein the non-transitory computer-readable storage medium further stores computer-readable instructions that upon execution on the computing device cause the computing device at least to:

detect that the voting instruction from the first review user comprises information indicative of a correction to a reason for the report event submitted by the first client computing device;

store the correction to the reason for the report event in a list of reason corrections corresponding to the report event; and replace the reason for the report event with a corrected reason in response to a determination that a number of the corrections from review users is greater than or equal to a predetermined threshold, wherein the corrected reason is presented and viewable via the interface by a fourth review user among the plurality of review users.

* * * * *